United States Patent [19]
Kondo et al.

[11] Patent Number: 6,104,864
[45] Date of Patent: Aug. 15, 2000

[54] MOVING IMAGE JUDGING

[75] Inventors: Noriyuki Kondo; Eijiro Narukawa, both of Tokyo, Japan

[73] Assignee: Plusmic Corporation, Tokyo, Japan

[21] Appl. No.: 08/840,302

[22] Filed: Apr. 9, 1997

[30] Foreign Application Priority Data

| Apr. 30, 1996 | [JP] | Japan | 8-108909 |
| Apr. 30, 1996 | [JP] | Japan | 8-108910 |
| Apr. 30, 1996 | [JP] | Japan | 8-108911 |
| Apr. 30, 1996 | [JP] | Japan | 8-108912 |

[51] Int. Cl.$^7$ ................................. H04N 5/225
[52] U.S. Cl. ..................... 386/117; 386/109; 348/137
[58] Field of Search ................ 386/46, 109, 117; 348/135, 136, 137, 157; H04N 5/225

[56] References Cited

U.S. PATENT DOCUMENTS

| 3,890,463 | 6/1975 | Ikegami et al. | 348/157 |
| 4,523,204 | 6/1985 | Bovay | 348/157 |
| 4,797,751 | 1/1989 | Yamaguchi . | |
| 5,136,283 | 8/1992 | Nobs . | |
| 5,493,331 | 2/1996 | Takahashi et al. | 348/157 |
| 5,671,010 | 9/1997 | Shimbo et al. . | |

OTHER PUBLICATIONS

*Patent Abstracts of Japan*, JP A.HI–174174, Yoshihisa Yamaguchi, Appln. No. 62–332449, Dec. 28, 1987, Start Picture Video Device.
*Patent Abstracts of Japan*, JP A S63–316986, Yoshihisa Yamaguchi, Appln. No. 62–152803, Jun. 19, 1987, Video Decision Device.
*Patent Abstracts of Japan*, JP A S63–316985, Yoshihisa Yamaguchi, Appln. No. 62–152801, Jun. 19, 1987, Video Decision Device.

*Primary Examiner*—Wendy Garber
*Assistant Examiner*—Christopher Onuaku
*Attorney, Agent, or Firm*—Frishauf, Holtz, Goodman, Langer & Chick, P.C.

[57] ABSTRACT

A moving image judging apparatus for displaying an image on a video display monitor. A line sensing camera includes a line sensor having more pixels than a number of vertical scanning lines of the video display monitor, and produces input video signals of images of moving objects by scanning the moving objects using line sensor elements to scan in a direction orthogonal to a moving direction of the moving objects. A video image processing apparatus converts the input video signals from the line sensing camera into digital image data signals which are stored into a memory sequentially according to a time sequence, then read out for displaying and converted into analog output video signals as output signals. The image processing apparatus includes a memory for storage purpose having a first memory area for the digital image data signals to be stored sequentially according to the time sequence and a second memory area for information data concerning the digital image data signals. A memory for display purpose stores image data necessary for displaying image data and drawing information data to be composed with the image data which are written in and afterwards read out in synchronization to a video displaying signal. Time, time lines and information on images are stored as the drawing information data. An output means composes the image data and the drawing information data to convert to analog output video signals. A control means which has a connection interface to external equipment, selects an operation mode according to a selection command, controls the signal conversions from analog to digital and digital to analog, controls the data composition of image data and drawing information data, controls reading and writing of the memory for storage purpose and the memory for display purpose, and generates the drawing information data.

10 Claims, 19 Drawing Sheets

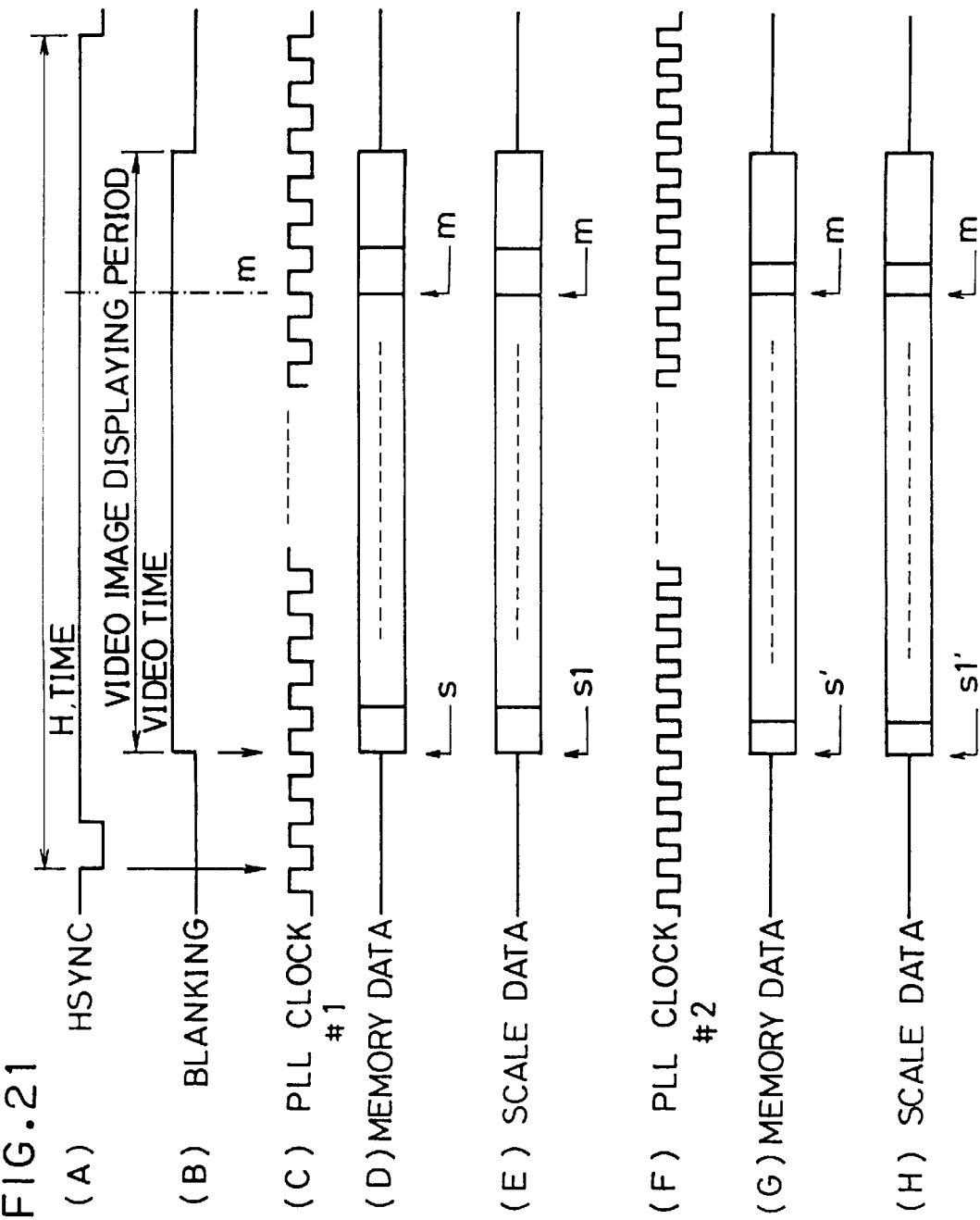

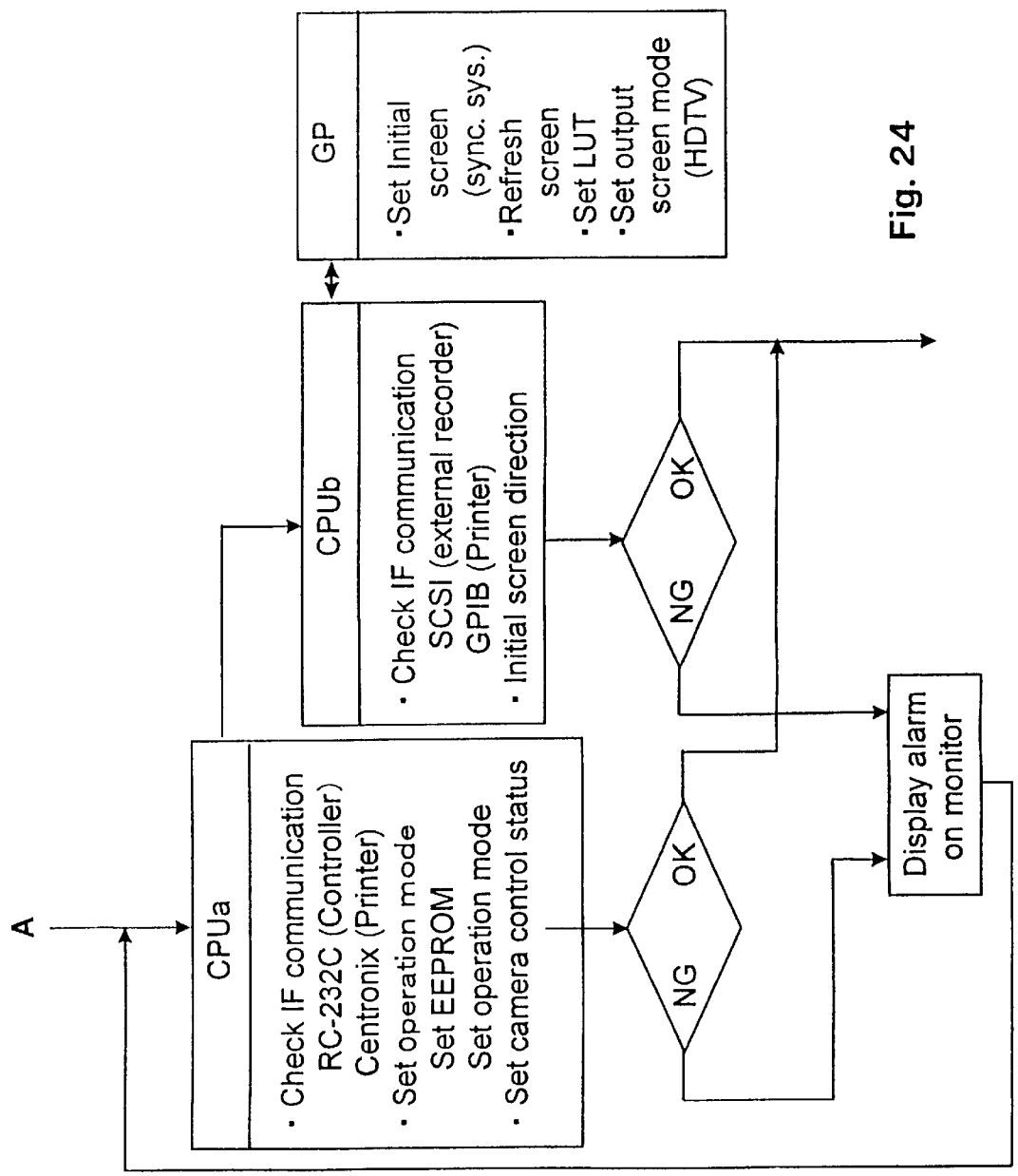

MOVING IMAGE JUDGING

BACKGROUND OF THE INVENTION

This invention describes a moving image judging apparatus for deciding the participant arrival order in a horse race, a bicycle race, a motorboat race or a motorbike race and the like, or for recognizing the shape of swiftly moving objects and characters.

DESCRIPTION OF THE PRIOR ART

A slit camera has been generally used for judging the arrival order in a horse race, a bicycle race, a motorboat race, a motorbike race and the like. It is difficult, however, to judge rapidly by using a slit camera, for this method needs some time to develop the recorded film. In the prior art several moving image judging apparatus have been proposed which can make such judgment rapid and easy, by converting video images to electrical signals and by processing those signals in the form of digital data (see JP, A, S63-316986/S63-316987/H1-174174, JP, B, H4-50792/H7-794701H7-79471/H7-79472).

In such a proposed moving image judging apparatus, a line sensing camera, which has a plurality of photo-sensitive elements laid in line, scans vertically images of the moving objects which pass the finish line. The output analog electrical signals from the line sensing camera are converted to digital data in the form of video images at a prescribed time interval, and then written orderly into a sequential video memory which has a capacity enough for plurality of video images on a video monitor screen. The video images recorded for a necessary time period are afterwards read out from the memory, converted to analog signals and then displayed on the video monitor screen. The scan speed (or the unit storage time) of the line sensing camera is set to $\frac{1}{1000}$ second, enabling precise order judgment in formal horse races, motorboat races and the like. The scanned signals are stored in the memory for 16(sixteen) seconds from the start of recording, so that the video monitor can display real time images sequentially at the rate of one whole picture on the video monitor screen in one second. Thus a judge can decide arrival times and the arrival order of race competitors by operating a scrolling bar to scroll and check the picture.

In judging the arrival order of a horse race, a bicycle race, a motorboat race, a motorbike race and the like, it is necessary to check and record the lapse of time from start to finish, besides the judgment result of the arrival order. In order to meet this requirement, data for the lapsed time are superimposed on the pixel data of moving objects in said prior moving image judging apparatus (see JP, B, H7-79472). More precisely, a reference time line and lapsed time information are displayed on the screen by using a time data generator which generates lapsed time data at each $\frac{1}{10}$ second. Additionally, lapsed time data with $\frac{1}{100}$ second interval from the race start are written in the video memory simultaneously with the object images, so as to display lapsed time lines with $\frac{1}{100}$ second interval on the monitor screen.

In order to decide and record the arrival order and arrival times in a race, a judge must read the reference time line and the lapsed time lines on the still image displayed on the video monitor, and then input manually the value of the lapsed time to the apparatus. As this manual procedure must be iterated for each of the race participant results, it becomes not only a tiresome and complex work for the judge but also a cause of a misreading or an input error of the elapsed time data.

For making a rapid and precise judgment even if a plurality of moving objects pass a finish line at very short time differences, time scale lines which are in parallel with the scanning direction of the line sensing camera are displayed on the screen in some of said prior moving image judging apparatus (see JP, B, H7-79471, for example). But when a plurality of other auxiliary lines with a spacing of one horse's length are necessary on the screen to identify the arrival time differences in terms of horse's lengths, the above-mentioned time scale lines and these auxiliary lines cannot become easily distinguished, causing difficulty in judging.

A so-called flying start method is adopted in motorboat races, where all participant boats begin to go round the racecourse triggered by a starting signal for the formal race by a judge, and the actual race starts at the time when the main clock of the racecourse points time zero second after a predetermined time. That is, in a motorboat race, each boat starts to run at the starting signal to take the most advantageous course for the boat, and controls its approach run in order to pass the start line just after the race starting time (time zero second). If a boat passes the start line before time zero, the boat fails the race as committing "flying", that is in violation of rules. On the contrary, if a boat passes the start line later than one second after the time zero second, the boat also fails the race, which is also in violation of rules. It is necessary to judge quickly whether flying or overtime is committed or not at the race start. That is, it is necessary not only to judge that there are no boats which passed the starting line at the time zero second, but also to judge that all of the boats passed the start line at one second after the race had been started.

In judging whether the start is valid or not for each participant boat, the line of time zero second and the line of time one second are displayed in the starting scene on the monitor screen, and whether each participant boat is between these two lines or not is checked. In doing this, if the stem or the stern of a boat is overlapped on one of these lines, it becomes difficult for the judge to distinguish the lines and the overlapped portion of the boat, because all of them are displayed in the same white color on the screen. This means the difficulty in judging a flying or overtime of each boat at the start. In recording the start time of each boat, the judge must read time on the screen by using the lines of lapsed time with $\frac{1}{10}$ second interval as references. In such a case also, the lines of time zero second and the time one second become indistinguishable from the lines of lapsed time, inducing similar difficulty.

Also when image data recorded by external equipment are replayed in said moving image recognition apparatus, the apparatus should be set just in the same circumstance as the recording condition, in which the competitors run clockwise or counterclockwise, for example.

In horse races, competitors generally tend to cluster inside of the racecourse when they approach to the goal. So, if a line sensor is used which has a pixel number comparable to that of vertical scanning lines of the monitor display, the whole course near the finish line is displayed on the monitor screen, resulting in the degradation of vertical resolution and hence a vertically shortened image of horses. Raising only the resolution for inside of the course as compared to outside of the course may be risky, because sometimes horses may spurt across the course from outside to inside when they approach to the goal. One conventional method to avoid this inconvenience is to use two cameras, one is positioned to take inside course mainly and the other is placed to take the whole course, in order to complement each other. This method, however, requires two cameras to memorize different images, so that both the number of cameras and memory capacity must be increased. Another conventional method is to use a special video monitor which has a different aspect ratio in order to display vertical scanning lines corresponding to the whole number of vertical sensing pixels. This method is impractical, however, because if the racing scene must be observed in several number of different places, the same number of special monitors are required.

In said prior moving image judging apparatus, if the scanning speed of the line sensing camera and the moving speed of an object are not equal, the displayed image of the moving object read out from the video memory become shortened or stretched in the horizontal direction. The inventor already proposed an apparatus which can compress or expand displayed images on the monitor screen to adjust them to the actual proportion of the objects(see JP, A, H63-316986, for example). But this method has some inconveniences in that the moving object images become compressed at the right hand side of the monitor screen, because the number of pixels are changed by varying the clock frequency after fixing the read out starting position, in other words by changing the display starting address of the video memory, making the scanning start position at the left hand side corner of the video screen as the base point of compression or expansion.

In a case where objects are moving to the right hand side of the video screen, judgment lines are normally positioned on the right half of the screen. In such cases especially, if images are expanded or compressed, the judgment lines are also moved in accordance with the rate of stretching or shortening. In many cases, however, judgment lines should not be moved from the initial place on the monitor screen, because otherwise cumbersome scrolling may become necessary to move judgment lines to the same positions as in the former picture. As an example, when enlargement of the scope on the screen is required in order to judge the order of the whole participants, or to see whether other participants are following behind or not, it becomes necessary to scroll the screen to the right direction. As another example, if the resolution should be increased near the judgment lines, scrolling to the left direction may be necessary, because images will be shifted relatively to the left.

SUMMARY OF THE INVENTION

It is an object of the invention to solve above mentioned problems through provision of novel methods to enable accurate, easy and reliable judgment of arrival order in a race, and to enable replay of data recorded in external equipment without consideration of setting conditions of the judging equipment.

The main points of this invention are summarized 5 points as follows;

(1) In the prior arts, in order to decide and record the arrival order and arrival times in a race, one must input manually the value of the lapsed time to the apparatus. As this manual procedure must be iterated for each of the race participant results, it becomes not only a tiresome and complex work for the judge but also a cause of a misreading or an input error of the elapsed time data. In this invention, a scale line is composed and displayed on video picture, and automatic time measurement is carried out by reading time data that correspond to the position of the displayed scale line. (For example, claim 7)

(2) In the prior arts, in the case that competitors generally tend to cluster inside of the racecourse when they approach to the goal in horse races, it is needed to use two cameras, one is positioned to take inside course mainly and the other is placed to take the whole course. But in this invention, it is solved by switching operation between wide angle image output and focused image output, using only one sensing camera, that is pixel number expansion or compression in the vertical direction is carried out at reading out from memory for display purpose in synchronization to the video displaying signal.(For example, claim 11)

(3) In the prior arts, the inventor already proposed an apparatus which can compress or expand displayed images on the monitor screen to adjust them to the actual proportion of the objects, but this method has some inconveniences in that if images are expanded or compressed, the judgment lines are also moved in accordance with the rate of stretching or shortening. In many cases, judgment lines should not be moved from the initial place on the monitor screen, because otherwise cumbersome scrolling may become necessary to move judgment lines to the same positions as in the former picture. This occurs by the fact that the moving object images become compressed or expanded at the right hand side of the monitor screen, because the number of pixels are changed by varying the clock frequency after fixing the read out starting position. In the prior arts, the scanning start position was made at the left hand side corner of the video screen as the base point of compression or expansion. In this invention, it is solved by that the starting positions of reading out of display memories are determined in reference to a predetermined position on the displayed video picture. In other words, one can make the predetermined position without moving of the judgment line. (For example, claim 13)

(4) In the prior arts, the time scale lines and the auxiliary lines cannot become easily distinguished, causing difficulty in judging. But in this invention, plural number of auxiliary lines on the displayed image use different displaying modes from those for other lines, such as different colors or different kinds of lines.(For example, claim 22)

(5) In order to accomplish above mentioned objects (1)–(4), this apparatus comprises memory means for display purpose where image data necessary for displaying image data and drawing information data to be composed with said image data are written in and afterwards read out in synchronization to a video displaying signal, comprising an image data display memory where the image data and the information data are stored, a time display memory where time, time lines and information on images are stored as said drawing information data, and a scale & measurement display memory where a scale line for time measurement of displayed images are stored. In prior arts, there were not an image data display memory, a time display memory and a scale & measurement display memory. (For example, claim 1)

For particulars in order to meet these objects, the invention is characterized as the following;

a moving image judging apparatus comprising: (a) a line sensing camera which produces input video signals of images of moving objects by scanning said moving objects using line sensor elements to scan in the direction rectangular to the moving direction of said moving objects, (b) a video image processing apparatus which converts said input video signals from said line sensing camera into digital image data signals, stores said digital image data signals into a memory sequentially according to the time sequence, then reads out said image data signals stored in the memory area necessary for displaying and converts them into analog output video signals as output signals, (c) a controller for said image processing apparatus to select an operation mode and to control the apparatus, and (d) an external output apparatus which displays said analog output video signals from said image processing apparatus, wherein said image processing apparatus comprising: (p) a memory means for storage purpose which has a memory area for said digital image data to be stored sequentially according to the time sequence and a memory area for information data concerning said digital image data, (q) a memory means for display purpose where image data necessary for displaying and drawing information data to be composed with said image data are written in and afterwards read out in synchronization to a video displaying signal, comprising an image data display memory where the image data and the information data are stored, a time display memory where time, time lines and information on images are stored as said drawing information data, and a scale & measurement display memory where a scale line for time measurement of displayed images are stored, (r) an output means which composes said image data and said drawing information data to convert to analog output video signals, and (s) a control means which has a connection interface to external equipment, selects an operation mode according to a selection command from said controller, controls said signal conversions from analog to digital and digital to analog, controls said data composition of image data and drawing information data, controls reading and writing of said memory means for storage purpose and said memory means for display purpose, generates said drawing information data, and controls other necessary functions of said moving image judging apparatus.

The image processing apparatus includes a time data generating means which starts counting time when triggered by a starting signal and generates sequentially time data corresponding to the elapsed time from the beginning of the time counting, it stores the time data generated by said time data generating means as the information data into said memory area for information data, said memory means for storage purpose has a memory area for drawing information data, said control means generates drawing information data to be composed with image data based on said information data stored in said memory area for information data, stores the drawing information data into said memory area for drawing information data and then writes the drawing information data into the memory means for display purpose together with said digital image data.

Furthermore, said control means is characterized in that; it generates drawing information data for the scale line and stores them into said scale & measurement display memory, stores said information data together with said image data into said image data display memory and then measures time by reading the time data at the position of said scale line from the information data, said information data include information of moving direction of said moving objects, and said control means controls reading and writing directions for said memory means for storage purpose and memory means for display purpose.

Another object of the invention is to solve one of the problems explained herein before(p.3 1.27–p.4 1.5), enabling switching between wide angle image output and focused image output, using only one sensing camera and recorded images by the camera for the purpose to take the whole course or the inside course in accordance with a horse race. In order to meet this object, the invention is characterized as the following; in a moving image judging apparatus comprising: (a) a line sensing camera which produces input video signals of images of moving objects by scanning said moving objects using line sensor elements to scan in the direction rectangular to the moving direction of said moving objects, (b) a video image processing apparatus which converts said input video signals from said line sensing camera into digital image data signals, stores said digital image data signals into a memory sequentially according to the time sequence, then reads out said image data signals stored in the memory area necessary for displaying and converts them into analog output video signals as output signals, (c) a controller for said image processing apparatus to select an operation mode and to control the apparatus, and (d) an external output apparatus which displays said analog output video signals from said image processing apparatus, wherein said image processing apparatus comprising: (p) a memory means for storage purpose which has a memory area for said digital image data to be stored sequentially according to the time sequence and a memory area for information data concerning said digital image data, (q) a memory means for display purpose where image data necessary for display and drawing information data to be composed with said image data are written in and afterwards read out in synchronization to a video displaying signal, (r) an output means which composes said image data and said drawing information data to convert to analog output video signals, and (s) a control means which has a connection interface to external equipment, selects an operation mode according to a selection command from said controller, controls said signal conversions from analog to digital and digital to analog, controls said data composition of image data and drawing information data, controls reading and writing of said memory means for storage purpose and said memory means for display purpose, generates said drawing information data, and controls other necessary functions of said moving image judging apparatus, and said control means controls data transfer from said memory means for storage purpose to said memory means for display purpose, and controls reading data from said memory means for display purpose, according to a selection command of compression or expansion.

Also in the image processing apparatus, said memory means for storage purpose has an memory area for drawing information data, said control means generates drawing information data to be composed with image data based on said information data stored in said memory area for information data, stores the drawing information data into said memory area for drawing information data and then writes the drawing information data into the memory means for display purpose together with said digital image data, and said memory means for display purpose comprised an image data display memory where the image data and the information data are stored, a time display memory where time, time lines and information on images are stored as said drawing information data, and a scale & measurement display memory where the scale line for time measurement of displayed images are stored, and said control means transfer the image data, the information data and the drawing information data of which horizontal pixel numbers are compressed or expanded according to a selection command of compression or expansion, from said memory means for storage purpose to said memory means for display purpose, and then read compressed or expanded image data and drawing information data from said memory means for display purpose.

The invention is also characterized in that; in moving image judging apparatus where a line sensing camera scans moving objects in the direction rectangular to the moving direction at a predetermined time interval in order to get video image signals, said video image signals are converted to digital image data signals and then stored in a video memory sequentially together with information data containing time data for said image data, contents in a memory area necessary for displaying are read out, composed with drawing information data which are displayed according to said information data, converted to video image signals and then displayed on a monitor screen: image data in said memory area necessary for displaying are written in a memory for display purpose and then read out in synchronization to a video displaying signal, pixel number expansion or compression in the horizontal direction is carried out at data transfer from said video memory to said memory for display purpose, pixel number expansion or compression in the vertical direction is carried out at reading out from said memory for display purpose in synchronization to the video displaying signal, having 3 modes which are a pixel number expansion/compression mode in the horizontal direction, a pixel number expansion/compression mode in the vertical direction and a pixel number expansion/compression mode in both horizontal and vertical directions.

A further object of the invention is to solve another one of the problems explained herein before(p.4 1.7–18), by enabling fixing the position of the scale line in the central area of the monitor screen for the purpose of staying judgment line at the initial position on the monitor screen after expansion/compression in the horizontal direction. In order to meet this object, the invention is characterized as the following; in a moving image judging apparatus comprising: (a) a line sensing camera which produces input video signals of images of moving objects by scanning said moving objects using line sensor elements to scan in the direction rectangular to the moving direction of said moving objects, (b) a video image processing apparatus which converts said input video signals from said line sensing camera into digital image data signals, stores said digital image data signals into a memory sequentially according to the time sequence, then reads out said image data signals stored in the memory area necessary for displaying and converts them into analog output video signals as output signals, (c) a controller for said image processing apparatus to select an operation mode and to control the apparatus, and (d) an external output apparatus which displays said analog output video signals from said image processing apparatus, wherein said image processing apparatus comprising: (p) a memory means for storage purpose which has a memory area for said digital image data to be stored sequentially according to the time sequence and a memory area for information data concerning said digital image data, (q) a memory means for display purpose where image data necessary for displaying and drawing information data to be composed with said image data are written in and afterwards read out in synchronization to a video displaying signal, (r) an output means which composes said image data and said drawing information data to convert to analog output video signals, and (s) a control means which has a connection interface to external equipment, selects an operation mode according to a selection command from said controller, controls said signal conversions from analog to digital and digital to analog, controls said data composition of image data and drawing information data, controls reading and writing of said memory means for storage purpose and said memory means for display purpose, generates said drawing information data, and controls other necessary functions of said moving image judging apparatus, and at expansion or compression of video display image said control means transfers image data necessary for displaying and information data from said memory means for display purpose, expands or compresses pixel number of data read out from said memory means for display purpose in synchronization to said video displaying signal, and determines the starting position of reading said memory means for display purpose according to a predetermined position on the video display image.

Also in the image processing apparatus, said memory means for storage purpose has an memory area for drawing information data, said control means generates drawing information data to be composed with image data based on said information data stored in said memory area for information data, stores the drawing information data into said memory area for drawing information data and then writes the drawing information data into the memory means for display purpose together with said digital image data, and said memory means for display purpose consists of an image data display memory where the image data and the information data are stored, a time display memory where time, time lines and information on images are stored as said drawing information data, and a scale & measurement display memory where a scale line for time measurement of displayed images are stored, and said control means generates drawing information data of the scale line, stores said drawing information data in said scale & measurement display memory, determines starting address for reading data from said image data display memory and from said time display memory in synchronization to said video displaying signal referring the memory address of said scale line as a reference address or determines starting address for reading data from said image data display memory in synchronization to said video displaying signal referring the memory address of the central position of the video display image as a reference address, calculates the pixel number in the horizontal direction by using said video displaying signal, calculates the pixel number from the starting address for reading to said reference addresses, and then renews according to the calculation result said starting addresses for reading data from said image data display memory and said time display memory.

A further object of the invention is to solve another one of the problems stated herein before(P.2 1.23–30), by enabling easy image recognition for judgment in a race where such judgment is carried out by using a judgment reference line, and by enabling easy recognition between moving object images and plurality of auxiliary lines or other reference lines or the like when they are displayed together. In order to meet the object, the invention is characterized as the following; in a moving image judging apparatus comprising: (a) a line sensing camera which produces input video signals of images of moving objects by scanning said moving objects using line sensor elements to scan in the direction rectangular to the moving direction of said moving objects, (b) a video image processing apparatus which converts said input video signals from said line sensing camera into digital image data signals, stores said digital image data signals into a memory sequentially according to the time sequence, then reads out said image data signals stored in the memory area necessary for displaying and converts them into analog output video signals as output signals, (c) a controller for said image processing apparatus to select an operation mode and to control the apparatus, and (d) an external output apparatus which displays said analog output video signals from said image processing apparatus, said image processing apparatus is having: (p) a memory means for storage purpose which has a memory area for said digital image data to be stored sequentially according to the time sequence and a memory area for information data concerning said digital image data, (q) a memory means for display purpose where image data necessary for displaying and drawing information data to be composed with said image data are written in and afterwards read out in synchronization to a video displaying signal, (r) an output means which composes said image data and said drawing information data to convert to analog output video signals, and (s) a control means which has a connection interface to external equipment, selects an operation mode according to a selection command from said controller, controls said signal conversions from analog to digital and digital to analog, controls said data composition of image data and drawing information data, controls reading and writing of said memory means for storage purpose and said memory means for display purpose, generates said drawing information data, and controls other necessary functions of said moving image judging apparatus, said memory means for display purpose is having a scale & measurement display memory where drawing information data to be composed with video display images are written in and later read out in synchronization to said video displaying signal, said control means generates drawing information data for the scale line and plurality of auxiliary lines and then stores them in said scale & measurement display memory, and said output means composes said plurality of auxiliary lines with other lines, using a different display mode other than display modes for other lines, in order to obtain an output video display image.

Also in the image processing apparatus, said control means is characterized in that; it contains a time data generating means which starts time counting when triggered by a starting signal and generates sequentially time data corresponding to the elapsed time from the beginning of the time counting, it stores the time data generated by said time data generating means into said memory area for information data as the information data, it carries out time measurement using said time data corresponding to the position of said scale line and stores the result in said scale & measurement display memory, using a different color or a different type of said auxiliary lines from colors or types of said other lines, as said different display mode.

DESCRIPTION OF DRAWINGS

The invention disclosed herein will be understood better with reference to the following drawings;

FIG. 21 is a figure to explain calculation procedure in determining starting address for reading out.

FIG. 24 shows detailed description for operation mode initialization A (65 in FIG. 23).

DESCRIPTION OF THE PREFERRED EMBODIMENT

Figure 1:
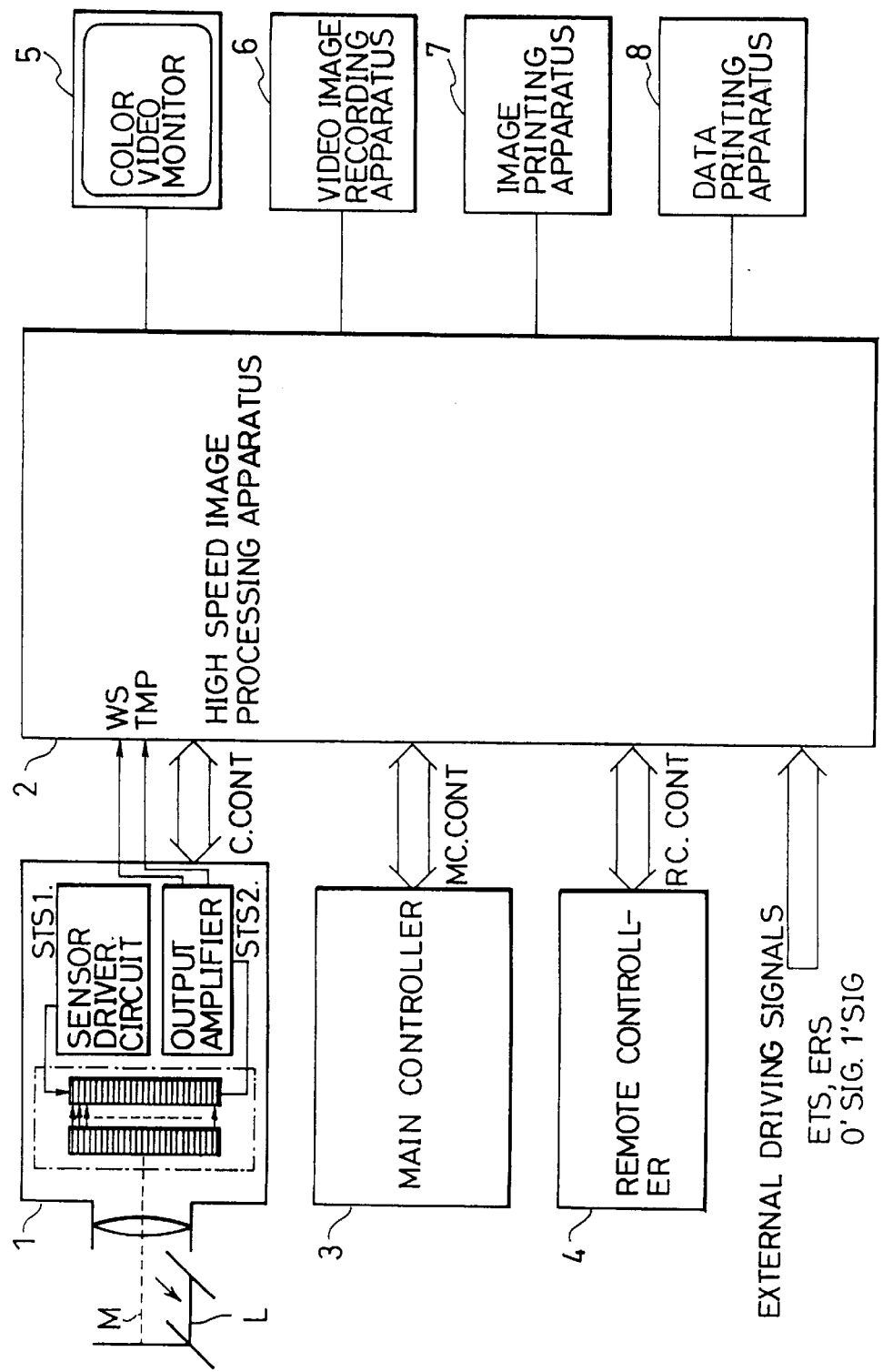
FIG. 1 shows the embodiment of the moving image judging apparatus of the invention.
Figure 2:
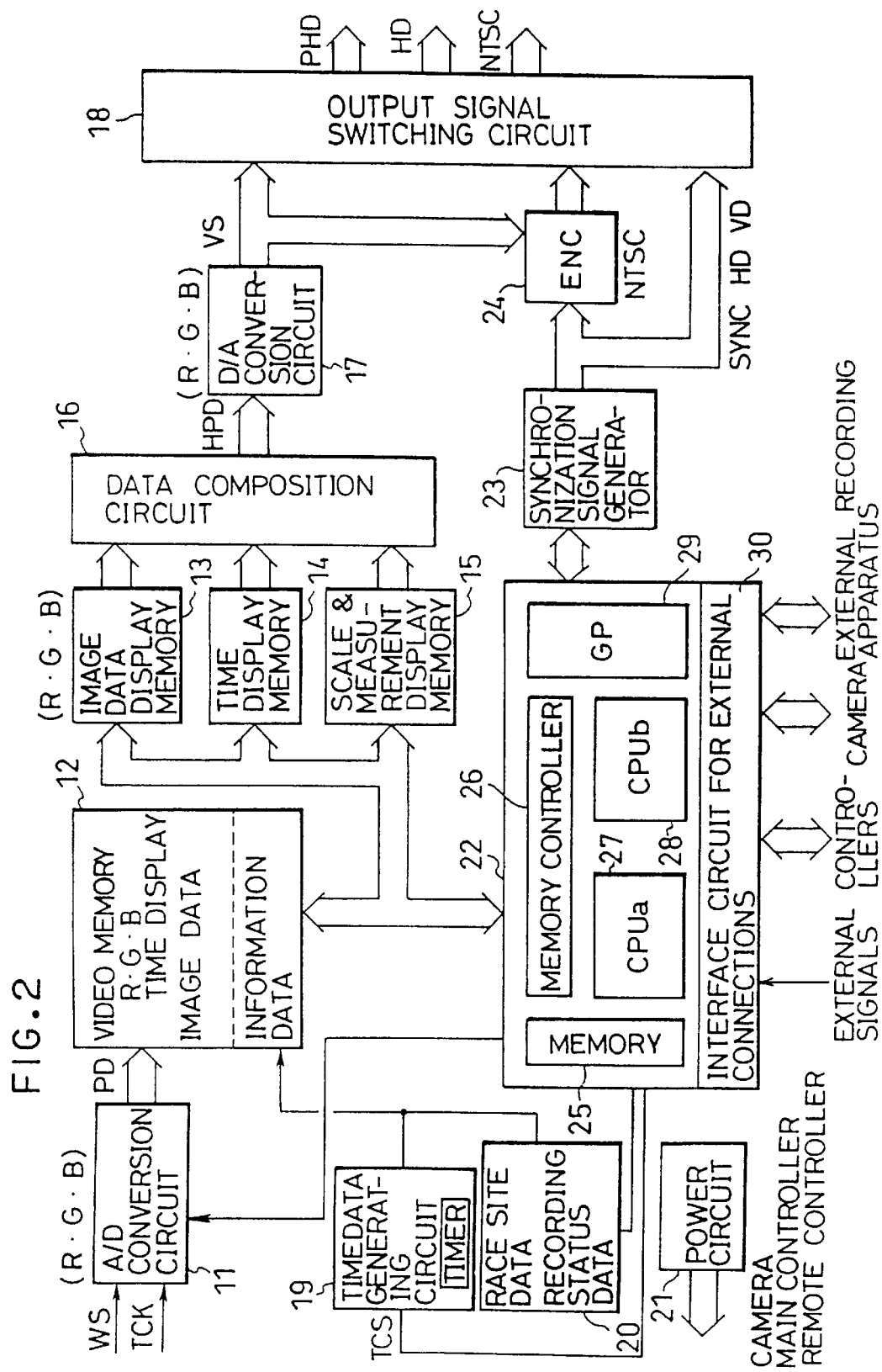
FIG. 2 shows an example of a high speed image processing apparatus.

The preferred embodiment of the invention will be explained hereinafter referring to drawings. FIG. 1 shows the embodiment of the moving image judging apparatus of the invention, and FIG. 2 shows an example of a high speed image processing apparatus. In FIG. 1 shown are; a line sensing camera 1, a high speed image processing apparatus 2, a main controller 3, a remote controller 4, a color video monitor 5, a video image recording apparatus 6, an image printing apparatus 7 and a data printing apparatus 8. In FIG. 2 shown are; an A/D (analog to digital) conversion circuit 11, a video memory 12, an image data display memory 13, a time display memory 14, a scale & measurement display memory 15, a data composition circuit 16, a D/A(digital to analog) conversion circuit 17, an output signal switching circuit 18, a time data generating circuit 19, an information data memory 20, a power circuit 21, a controller 22, a synchronization signal generator 23, an ENC(encoder) 24, a memory 25, a memory controller 26, CPUs 27 and 28, a GP(graphic processor) 29, and an interface circuit for external connections 30.

As is shown in FIG. 1, the moving image judging apparatus of the invention comprises; a line sensing camera 1 which generates an image of moving objects as time serial analog signals by scanning along one line orthogonal to the moving direction of the objects, a high speed image processing apparatus 2 which converts said analog electrical signals to digital image data signals, stores a part of said digital image data which correspond to a plurality of video display images, transfers the content of said video memory which corresponds to said video display images to an image data display memory and then converts the output of said image data display memory to analog output video signals 2, a main controller for an operator 3, a remote controller for a judge 4, a color video monitor 5, a video image recording apparatus 6, an image printing apparatus 7 and a data printing apparatus 8.

The line sensing camera 1 is located on an eye line (M) which is in parallel with the finish line (L), the high speed image processing apparatus 2 and the main controller 3 are located at a suitable place in a building where an operator can carry out equipment operation, and the remote controller 4 and the color video monitor 5 are located at a place where a judge carries out judgment of races. Both analog and digital type apparatus can be used for the video image recording apparatus 6 and for the image printing apparatus 7. The color video monitor 5 is a CRT display terminal which displays analog output video signals from the high speed image processing apparatus 2. The video image recording apparatus 6 is equipment which can record and replay video data signals, such as a magneto-optic recording device(MO), a data streamer(DAT), a compact disc player (CD) or a video tape recorder(VTR).

The line sensing camera 1, which comprises a set of zooming lenses, a color line sensor using charge coupled devices(CCD) as sensor elements, a sensor driver circuit and an output amplifier, is positioned so that it can take images along the vertical direction at the finish line. The color line sensor consists of a photo-electric converter which contains a one-dimensional array of photo-sensitive diodes each of which corresponds to one pixel and on each of which red(R), green(G) and blue(B) color filters are attached repeatedly in this order, and an output shift register.

The operation outline of said line sensing camera 1 is explained as follows; the image of a moving object which passes the finish line L is projected on the photo-electric converter through the zooming lens. The projected image is then converted to electrical signals (electronic charges, actually) by the photo-electric converter. The electrical signals are transferred to the output shift register at the same time (or in parallel, in other words) for each pixel, in synchronization to a scanning timing signal STS1 (photo transfer pulse) which is supplied by the sensor driver circuit, at each charge storage time. Output signals from the output shift register are transferred to the output amplifier sequentially (or in serial, in other words) in synchronization to another scanning timing signal STS2 (transfer pulse), and are then amplified. Output signals from the output amplifier are supplied to the high speed image processing apparatus 2 together with a timing pulse TMP, as video image signals VVS which contain components R, G and B. It's composition is well known at the prior arts.

The color line sensor in the line sensing camera 1 has 1728 pixels, for example, for each color component. For the video memory in the high speed image processing apparatus 2, 16Kbytes in the line direction (horizontal direction) and 2Kbytes in the column direction (vertical direction) are assigned as the total storage area. From the 2Kbytes in the column direction, 1728 bytes are assigned as the memory area for digital image data, and the remaining 320 bytes in the column direction are assigned as the memory area for information data (See FIG. 19 and FIG. 18). The invention is applicable for each type of video signal format, such as standard video signal format (NTSC), Hi-Vision video signal format and non-interlace Hi-Vision video signal format (PHD). The number of vertical scanning lines for a video display monitor are 485 for standard video, and 1035 for both Hi-Vision video and non-interlace Hi-Vision video. The number of pixels in the horizontal direction which actually corresponds to the resolution for the time axis is 1024 for every type of video signal formats.

The function of the high speed image processing apparatus 2 is explained hereinafter using FIG. 2; the A/D conversion circuit 11 in FIG. 2 converts each R, G, and B component of analog video signal VSS to 8 bit image data PD corresponding to the gradation(or brightness, in other words) of each pixel. When the signal level of the video signal VSS is at the lowest within a predetermined value area, output data "00000000" is generated. Likewise when the signal level of the video signal VSS is at the highest within the predetermined value area, output data "11111111" is generated by the conversion circuit.

The video memory 12 is a DRAM (dynamic random access memory) which has a storage area for image data and a storage area for information data. The digital image data converted from R, G and B components of the analog video signal are stored in the storage area for image data, and the information data are stored in the storage area for the information data, respectively, at every scanning time (charge storage time) of the color line sensor. Based on the information data, time and time lines can be drawn in a drawing area for time and time lines. Image data obtained by each scan are stored scan by scan in the vertical direction (or in the column addresses) of the storage area of the video memory 12. The image data are stored in the horizontal direction (or in the line addresses) time- sequentially for sixteen seconds at each 1/1000 second interval, for example. When image data for one second correspond to one full picture display, image data for sixteen pictures can be stored in this example. By assigning eight bits to each pixel of each color component R, G and B, the image data can have full color information(16,770,000 colors).

Among the information data which are stored in the video memory 12 together with the image data, there are time data, race site data, recording status data which correspond to operation modes such as the clockwise or counterclockwise course direction mode in horse races, the trial or formal race mode in motorboat races and the test mode, and other information on image data. The time data are provided by the time data generating circuit 19, and other information data are provided by a holding circuit for the race site data and the recording status data 20. The time data generating circuit 19 contains a timer, measures time by using a timer control signal TCS which is provided by the control circuit 22 and generates the time data (the elapsed time data). The holding circuit for the race site data and the recording status data 20 holds the information data from the control circuit 22, except the time data.

Among data which are stored in the video memory 12, the image data necessary for displaying and the information data are stored in the image data display memory 13 in preparation for displaying. The time display memory 14 stores data necessary for displaying time lines, time and the race site information on the video display image. The scale & measurement display memory 15 stores data necessary for displaying a scale line, auxiliary lines, measured time and a menu on the video display image. Each display memory 13, 14 or 15 consists of a video RAM which has a memory capacity of 2Kbytes in the line direction and 2Kbytes in the column direction. The image data necessary for displaying and the information data are transferred from the video memory 12 to the display memory 13 by using DMA (direct memory access) control, and the drawing information data for time and time lines are transferred also from the video memory 12 to the display memory 14 by using DMA control. The stored data in display memories 13 and 14, that is, the image data and the drawing information data for time and time lines, and the drawing information data stored in the display memory 15 are read out by a common video synchronization signal, to be transferred to the data composition circuit 16.

The data composition circuit 16 combines the image data, the drawing information data for time and time lines, the drawing information data for the scale line and the like to compose complete drawing information data for one full screen size of display. Processing priorities are assigned to the scale & measurement display memory 15, the time display memory 14 and the image data display memory 13 in this order. The D/A conversion circuit 17 converts output data from the data composition circuit 16 as the horizontal image data HPD which are read out from each display memory to be composed as one picture scan on a video monitor screen, to analog video image signals VS.

The controller 22 controls general operation of the whole apparatus of the invention, such as; selection of an operation mode according to a command from the main controller 3 which is operated by an operator or a command from the remote controller 4 which is operated by a judge; control of writing and reading of the video memory 12; generating conversion timing signals for the AND conversion circuit 11 and the D/A conversion circuit 17; generating Video synchronization signals; control of information data insertion; control of time count start or recording start triggered by an external signal; control of image data composition for the time display memory 14; control of image data composition for the time display memory 15, and the like. The controller contains two CPUs for such purposes. CPUa 27 mainly controls interfacing with external equipment, generating various operation commands according to commands from the main controller 3 for an operator and the remote controller 4 for a judge. The CPUb 28 executes each operation according to a command from the CPUa 27. CPUb 28 mainly controls a GP (graphic processor) 29, the video memory 12 and display memories 13, 14 and 15. The memory controller 26 controls writing and reading of image data for memories 12 to 15 using DMA control. The memory 25 consists of ROMs, RAMs, and EEPROMs for storing measurement data. The interface circuit (I/F) for external connection 30 consists of an external triggering signal I/F where such triggering signals are a time count start signal, a recording start signal, zero second signal for a motorboat race or one second signal for a motorboat race), a controller I/F (for both main and remote controllers), a camera control I/F and an external recording equipment I/F.

The power circuit 21 consists of a power circuit for the high speed image processing apparatus, a power circuit for the line sensing camera and a power circuit for main and remote controllers. The synchronization signal generator 21 generates a composite synchronization signal SYNC, a horizontal synchronization signal HD and a vertical synchronization signal VD, which conform to any one of the standard video signal format, the Hi-Vision video signal format and the non-interlace Hi-Vision video signal format. Selection of a video signal format is made by video output selection function of the main controller 3. The encoder (ENC) 24 is an NTSC encoder which generates NTSC composite video signals. The output signal switching circuit 18 delivers standard NTSC video signal output, Hi-Vision video signal output or non-interlace Hi-Vision video signal output to a proper output port.

Figure 3:
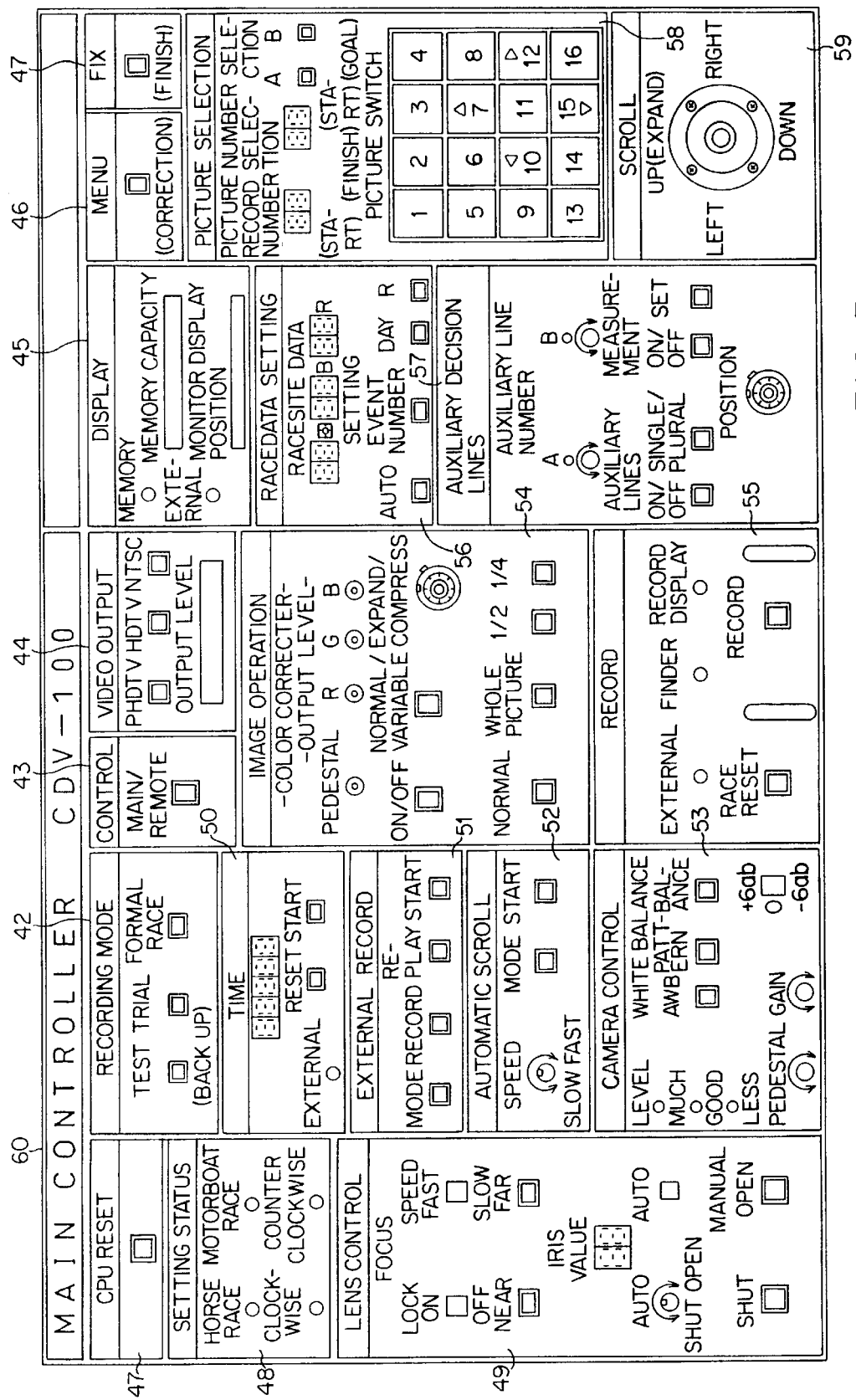
FIG. 3 shows a front panel layout example of a main controller for an operator.
Figure 4:
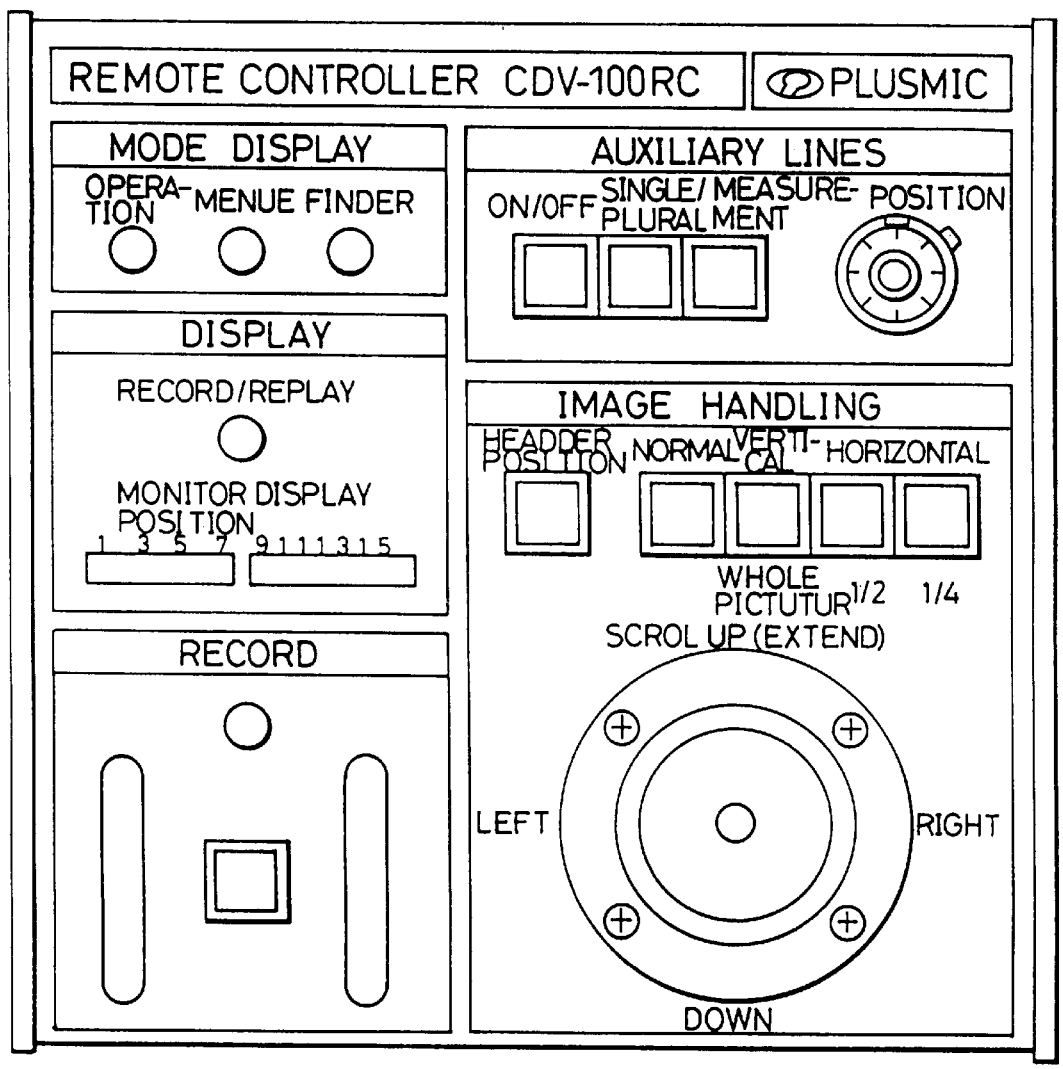
FIG. 4 shows a front panel layout example of a remote controller for a judge.

FIG. 3 shows a panel layout of the main controller for an operator, FIG. 4 shows a panel layout for the remote controller for a judge, FIG. 5 to FIG. 8 show image display examples for measurement settings, and FIG. 9 to FIG. 14 show print out examples for measurement settings. The main controller 3 for an operator and the remote controller 4 for a judge control various operation of the controller 22 in the high speed image processing apparatus 2. The main or remote controller comprises panels which have various operation buttons, LEDs and knobs. Functions of main panels of the main controller 3 will be explained hereinafter.

The "recording mode panel" 42 comprises the "test" button which is used to select trial record mode for horse races or race trial mode for motorboat races, the "trial" button which is used only in motorboat race mode to select trial record mode and the "formal race" button which is used to select the race record mode for horse races and the formal race record mode for motorboat races. Selection of the horse race mode or the motorboat race mode is done using a mode selection switch 60 which is located at the rear side of the main controller(going out of sight in the fig.). The back up record button triggers recording compulsorily, regardless the menu setting for record start. The "control" panel 43 has the "main/remote" button which switches major control functions of the main control panel to the remote control panel and vice versa. The "video output" panel 44 comprises "P.HDTV" button which selects non-interlace Hi-Vision scanning signals as output signals, the "HDTV" button which selects Hi-Vision scanning signals as output signals and "NTSC" button which selects NTSC scanning signals as output signals. The "display" panel comprises sixteen "memory capacity" LEDs which display bar indication of written memory area of the image memory, sixteen "monitor display position" LEDs which indicates the starting address of reading the image memory, the "memory" LED which indicates that records are displayed in one of the record modes and the "external" LED which indicates that records are displayed based on an external recorder. The "menu" panel 46 has the "menu" button which demands menu display for equipment status settings and which demands measured data correction when in the measurement setting display mode. The "fix" panel 47 comprises the "fix" button which commands registration of race site and race date data (order number of the race event, the race date and the race number of the day), fixing of setting items, fixing of selected items when in the external equipment record mode, registration of measured data and start of printing out when in the measurement setting display mode, and finishing the race trial when in the race trial mode of motorboat races.

The "setting status" panel 48 comprises the "horse race" LED, the "motorboat race" LED, the "clockwise" LED and the "counter clockwise" LED, which display the apparatus usage setting status whether it is a horse race, a motorboat race, in the clockwise course direction or in the counter clockwise course direction, respectively. The "time" panel

50 comprises the "reset" button which resets the display of the time indicator on the panel, the "start" button which triggers starting time count and the "external" LED which indicates whether starting time count is triggered by the "start" button or triggered by an external signal. The "record" panel 55 has the "record" button which triggers starting record of race trials which are held on a day before the formal horse races and of formal horse races, and which triggers starting record of trial and formal races in motorboat races, and the "race reset" button which interrupts recording after the record mode starts and returns the status to the initial stage of the record mode.

The "race data setting" panel 56 comprises the "event number" button which selects and sets the order number data of the race event to display on the monitor screen, the "date" button which selects and sets the date data of the race event to display on the monitor screen, the "R" button which selects and sets the race number data to display on the monitor screen and the "auto" button which enables automatic one increment of the race number. The "event number" indicator, the "day" indicator and the "R" indicator displays the serial race event number, the date of the race event and the race number, respectively. The "auxiliary line" panel 57 comprises the "auxiliary line on/off" button which selects whether auxiliary lines for decision are displayed on the video monitor or not, the "single/plural" button which selects the number of auxiliary lines when the "auxiliary line on/off" button is set to "on", the "auxiliary line number A" button and the "auxiliary line number B" button which set the number of auxiliary lines corresponding to the selection of the "selection A" (start) or the "selection B" (goal) buttons on the "picture selection panel" respectively, the "measurement on/off" button which selects whether measured data are displayed on the monitor screen or not and the "set" button which is used to input horse(boat) numbers and times of the race result for displaying. The "picture selection" panel 58 comprises the "selection A" button which selects camera 1 when in the horse race mode and selects the starting scene only for the formal race mode when in the motorboat race mode, the "selection B" button which selects camera 2 when in the horse race mode and selects the goal picture only for the formal race mode when in the motorboat race mode, "picture selection" sixteen-key buttons which are used for selection of display modes, and for setting of race site data or picture frame number, the "picture number" indicator which is used for indication of recorded frame numbers in each mode, indication of recording numbers in motorboat race trials, indication of starting picture number in external recording equipment and indication of replayed frame number, and the "selection" indicator which is used for indication of selected record frame number for each mode, indication of selected picture number for trial in a motorboat race and indication of the final picture number for external recording equipment. The "scroll" panel 59 has a joy stick which is used for moving an image to desired direction, for varying the scrolling speed and for extending the image size up to twice.

Among various operation modes are the horse race mode, the motorboat race mode, the external equipment record mode and the automatic scrolling mode. In recording a race trial using the horse race mode, images are recorded in the video memory for two picture frames so that the lens focusing around the targeted image can be adjusted correctly. In recording of each formal race, time count is started by a time start signal and the image of finishing scene near the goal is stored in the video memory. After the time start signal received from the outside central clock triggers a timer to start counting and just before horses reach the goal, the operator of the apparatus starts recording by using the "record" button of the "record" panel 55. Time count is automatically stopped when pictures are stored to make the memory full, finishing recording of the formal race.

At a motor boat race trial which is held on the day just before the formal race date, rehearsal scene of starting the race is recorded sequentially using the motorboat race mode. The race trial is started according to the sixty seconds before zero indication of the central clock, and recording is automatically started at a predetermined time selected from the recording start time menu (actually 0.5 seconds before the zero second signal), by using the external signal from the central clock. Starting scenes are recorded approximately for two seconds each (2 pictures) sequentially.

Each formal race is recorded on the day of formal races. Recording is automatically started at a predetermined time selected from the recording start time menu (actually two seconds before the zero second), by using the external sixty seconds before zero signal from the central clock. The starting scene is recorded for about four seconds (four pictures). The timer is reset to zero by the zero second signal from the central clock, and the zero second line is written into the video memory at the same time. The one second line is also written into the video memory at the one second signal from the central clock. After finishing recording the starting scene, video image containing the zero second line and the one second line is displayed on a monitor screen for about 1.3 seconds. A judge can decide by the recorded video image on the screen whether there was a flying or a falling behind at the start. Time count is started by the zero second signal from the central clock, and the finishing scene near the goal is recorded in the rest of the video memory. When all of the video memory area become full, the time count is automatically stopped and the formal race recording is finished.

In the external equipment record mode, the recorded video images are stored in external recording equipment such as an MO or a data streamer after recording by the apparatus was finished, using race data such as the event number, the event date or the race number as the name of the file. When in replaying, the recorded video images are read out from the external recording equipment by specifying the necessary file names, and then displayed on the monitor screen. Video image replay or other operations can be done just in the same status as in the record mode used (clockwise or counterclockwise course direction mode in horse races, the race trial mode or the formal race mode in motorboat races), by using the information data for video image data.

In the automatic scrolling mode, the whole recorded area starting from the first picture frame is displayed sequentially at a constant scrolling speed which is set by a speed adjustment knob for automatic scrolling. There are two modes for measurement operation; the measurement mode which is activated by the "measurement on/off" button, and the measurement display mode which is activated by the "set" button. In the measurement mode, a single line (as a scale line) and frames for indicating time along the scale line are displayed on the video monitor screen with time values themselves in the frames. Positions of the frames and the scale line are movable on the screen. In the measurement display mode, the number and the record time for each participant horse or boat are set and displayed.

In the horse race mode, for example, when the measurement "on/off" button is pushed for on, the measurement mode is activated to turn on the LED of the "on/off button", to turn off the LED of the "single/plural" button and to display the scale line and the frames for indicating time on the video monitor. Time values are displayed in the frames along the scale line. Time measurement is carried out by moving an auxiliary line to the nose position of the horse to be measured, using the "position" vernier dial. When the "on/off" button is pushed again for off, the measurement mode is inactivated to tern off video monitor display of the scale line and the frames for time values, and to turn off the LED of the "on/off" button.

When the measurement "set" button is pushed while the LED of the measurement "on/off" button is on, the measurement display mode is activated to turn on the LED of the "set" button, to display on the monitor screen the scale line and frames for time values, flashing on and off the indication of frames for horse numbers and for arrival orders. In this situation, a single auxiliary line on the monitor screen can be moved to the nose position of the leading horse by adjusting the "position" vernier dial, and image scrolling can be done also to move the leading horse nose into the right half area of the video screen where is suitable for measurement. When the horse number is entered from the sixteen-key, the number is displayed inside a frame for the horse number, and the number is registered if the "set" button is pressed. At this moment, the frame indication of the time value flashes on and off for noticing by the operator. The time value for the auxiliary line position is displayed inside the frame, and the time value is registered at the push of "set" button. Just the similar procedures, such as the horse image movement to the measurement area on the video screen, the auxiliary line movement to the horse nose position and entering and registration of the horse number, can be iterated for the next coming horse. Another push of the "set" button finishes and erases all display on the video screen, triggers memorization of all entered data, turns off the LED of the "set" button and changes the operation mode to the measurement mode. Also, if the "fix" button is pushed after entering whole necessary data, whole entered data are stored and printed out and the operation mode is changed to the measurement mode.

The maximum data capacity which can be registered and stored in the apparatus is; data volume for twelve races with 20 participating horses per race in horse races, data volume for 12 start and finish scenes with 6 participating boats per each race in motorboat formal races, and data volume for 16 start scenes with 6 participating boats per each trial in motorboat race trials. Data for a specified race can be displayed on the video screen as shown in FIG. 5 to FIG. 8 or printed out as shown in FIG. 9 to FIG. 14, by entering the race number from the sixteen-key to specify the registered data for the race. Printing out data for the whole races or for a specified race is possible through selection from a menu.

Figure 5:
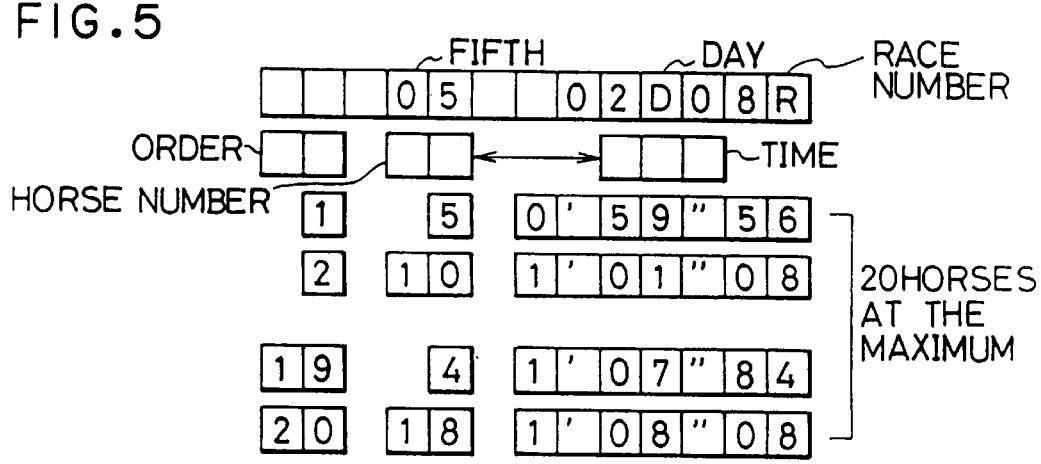
FIG. 5 shows an example of measurement setting display for a horse race.
Figure 6:
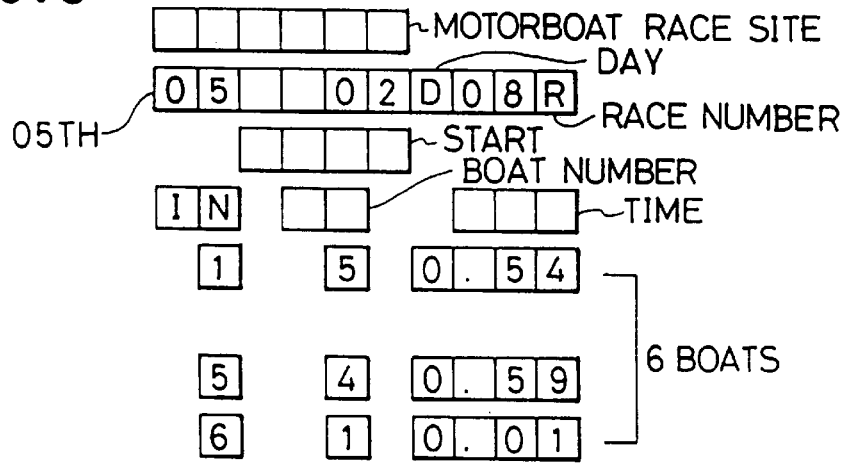
FIG. 6 shows an example of measurement setting display for formal race starting scene in a motorboat race.
Figure 7:
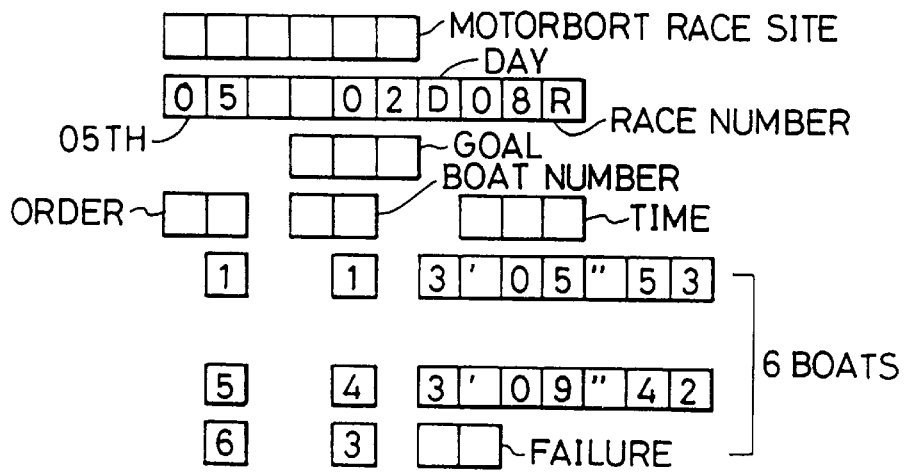
FIG. 7 shows an example of measurement setting display for a race finishing scene in a motorboat race.
Figure 8:
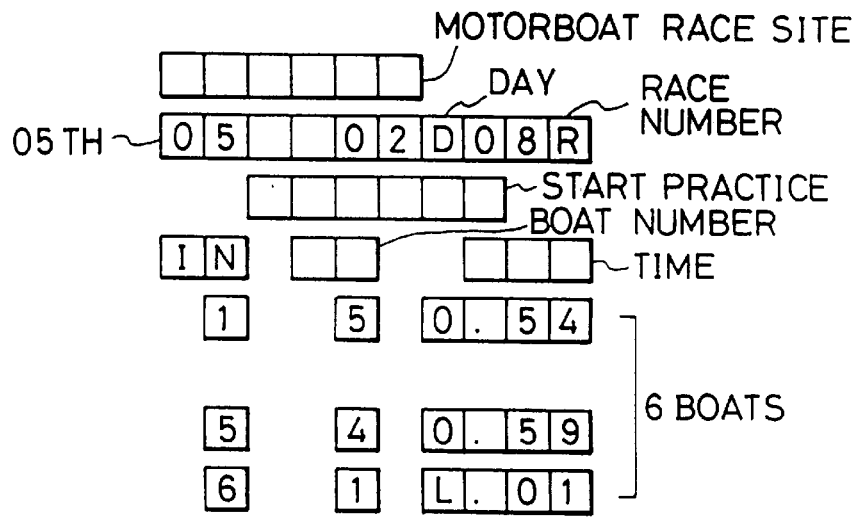
FIG. 8 shows an example of a measurement setting picture for the starting scene of a race trial which is carried out as a practice before the formal race in a motorboat race.
Figure 9:
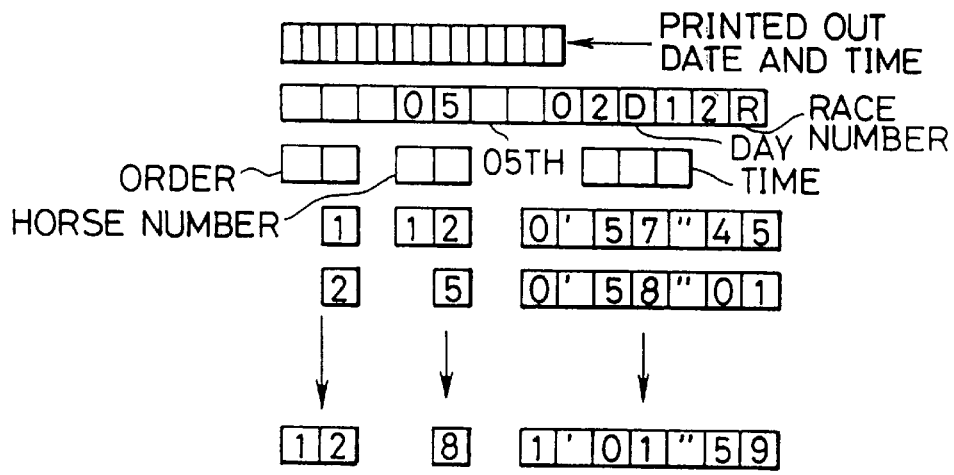
FIG. 9 shows a print out format example for horse race measurement.
Figure 10:
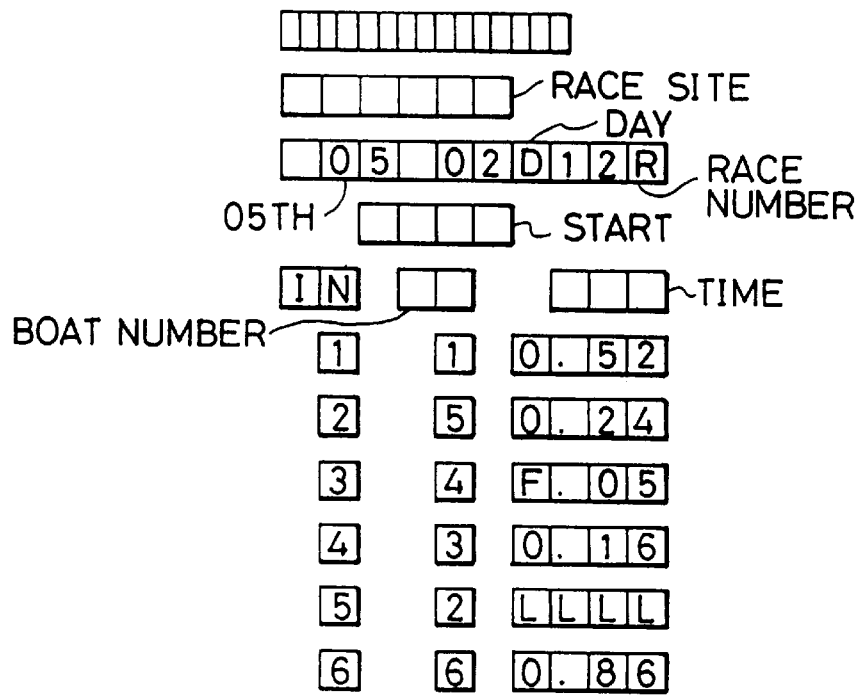
FIG. 10 shows a print out format example of a formal race starting measurement setting, among several print out formats for measurement setting in a motorboat race.
Figure 11:
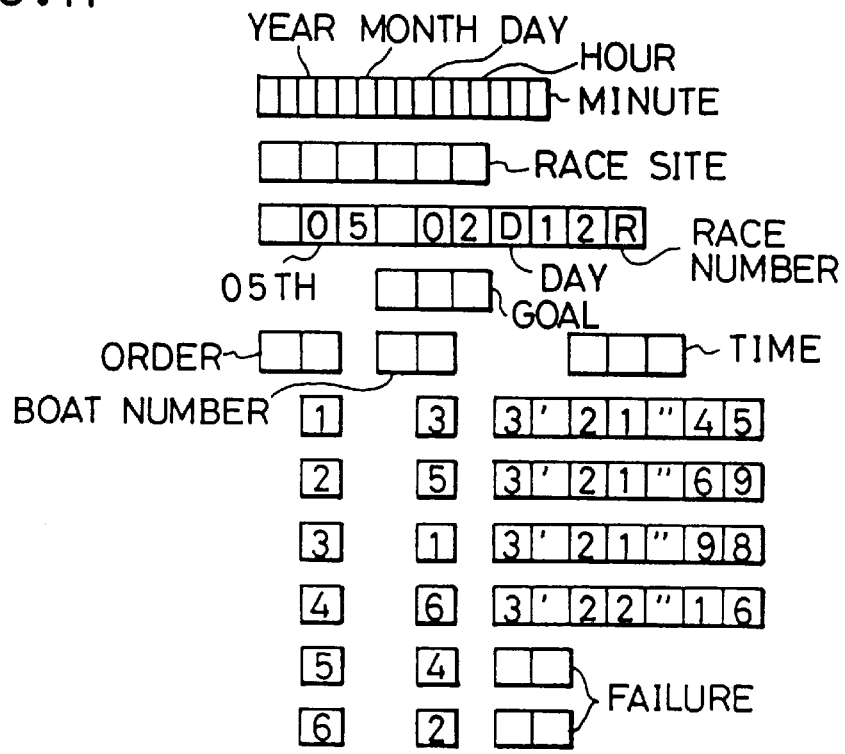
FIG. 11 shows a print out format example of a finish measurement setting, among several print out formats for measurement setting in a motorboat race.
Figure 12:
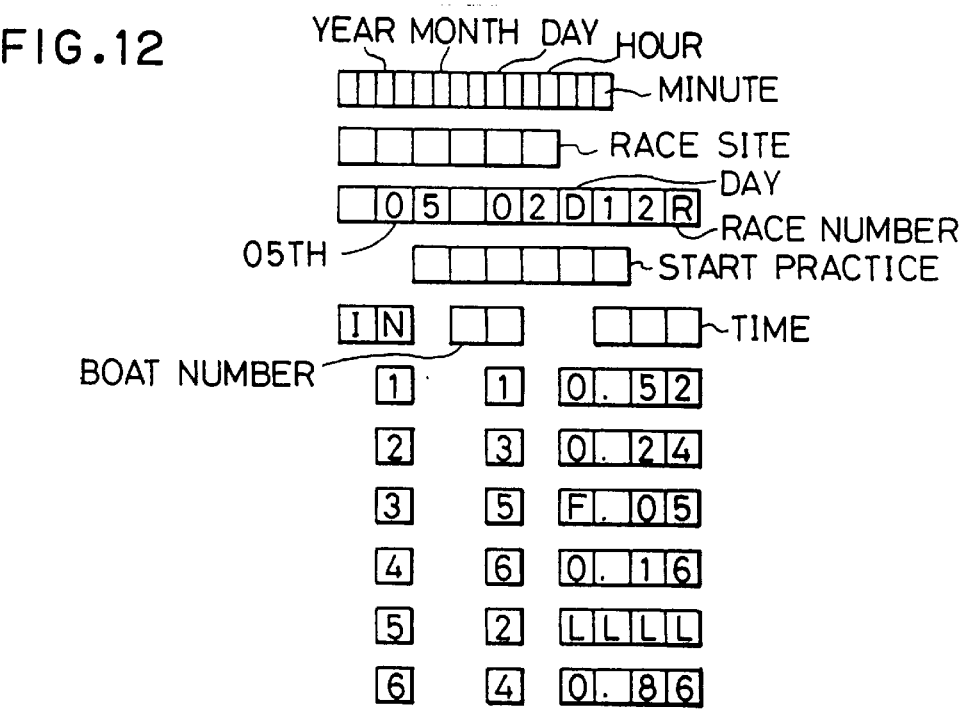
FIG. 12 shows a print out format example of a measurement setting for trial starting in a race trial mode.
Figure 13:
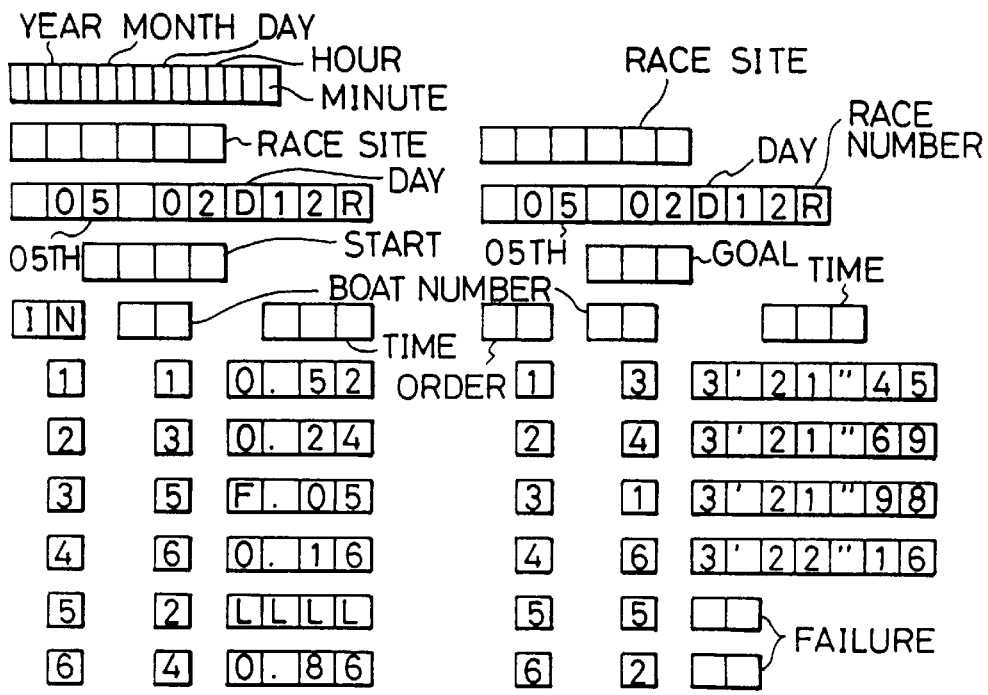
FIG. 13 shows a print out format example of one race and whole races in a formal race mode.
Figure 14:
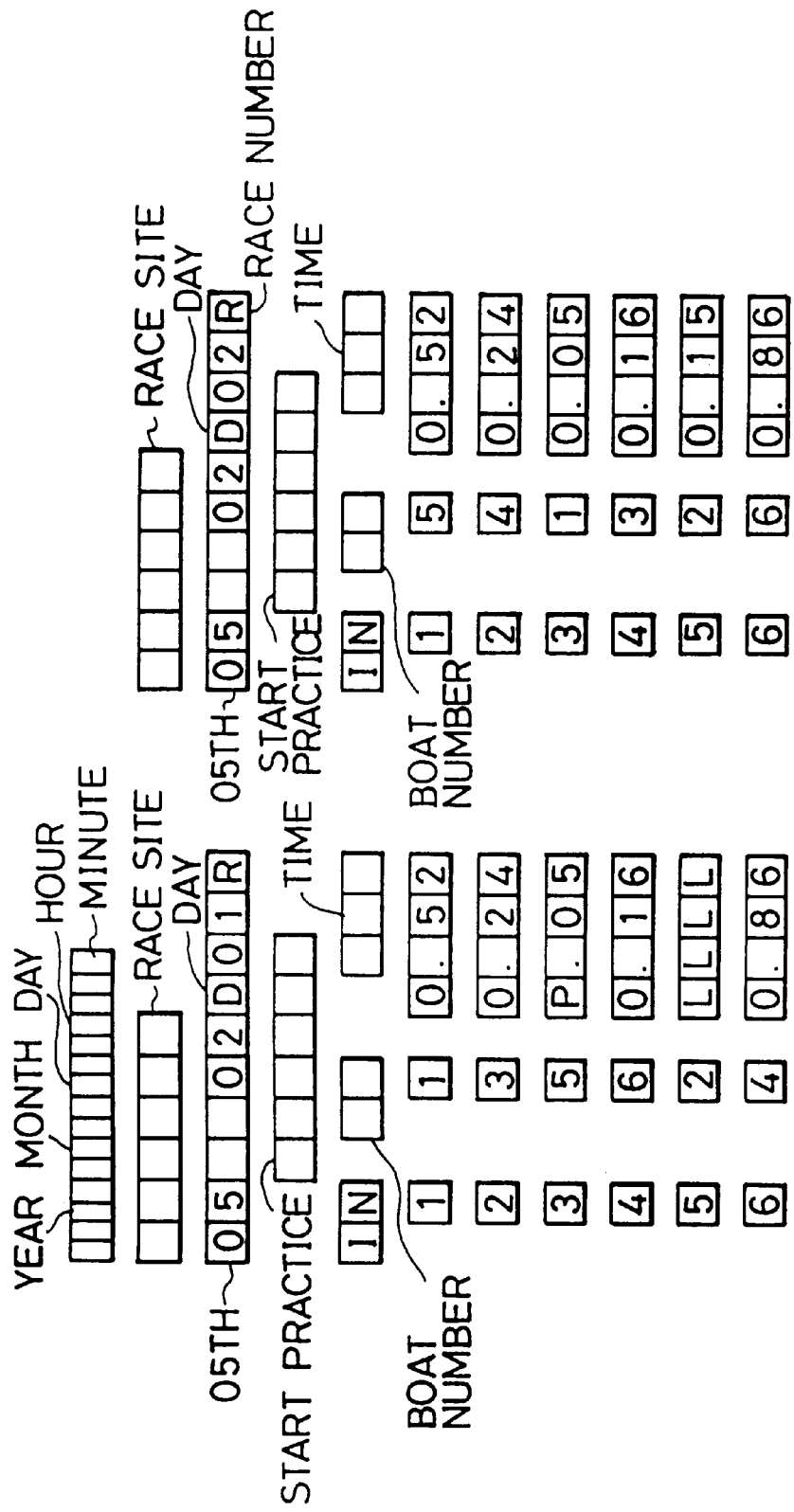
FIG. 14 shows a print out format example of whole trials in a trial race mode.

Video display examples for measurement settings are shown in FIG. 5 for a horse race measurement setting, in FIG. 6 for a measurement setting of a starting scene in a formal motorboat race, in FIG. 7 for a measurement setting of a finishing scene in a formal motorboat race and in FIG. 8 for a measurement setting of a starting scene in a motorboat race trial. Print out format examples for measurement settings are also shown in FIG. 9 for a horse race measurement setting, in FIG. 10 for a measurement setting of a starting scene in a formal motorboat race, in FIG. 11 for a measurement setting of a finishing scene in a formal motorboat race, in FIG. 12 for a measurement setting of a rehearsal scene of starting in a motorboat race trial, in FIG. 13 for a measurement setting of one formal motorboat race and of whole formal motorboat races and in FIG. 14 for a measurement setting of whole rehearsal scene in a motorboat race trial.

While the operation mode is set to the clockwise course direction mode for horse races and if video data writing and reading directions along the horizontal addresses of the video memory are not changed from those in the counterclockwise course direction mode, images on the video monitor screen are displayed as mirror images of the original, moving into the reverse direction of the actual race. In order to avoid this inconvenience, writing and reading directions along the horizontal addresses of the video memory are changed automatically to the reverse direction in such cases. When recorded data are displayed by external recording equipment, course direction information whether it is clockwise or counterclockwise is read from the information data among the video image data, so that writing and reading directions along the horizontal addresses of the video memory can be automatically changed according to the recording condition, enabling display of images moving in the same direction as actual races.

Figure 15:
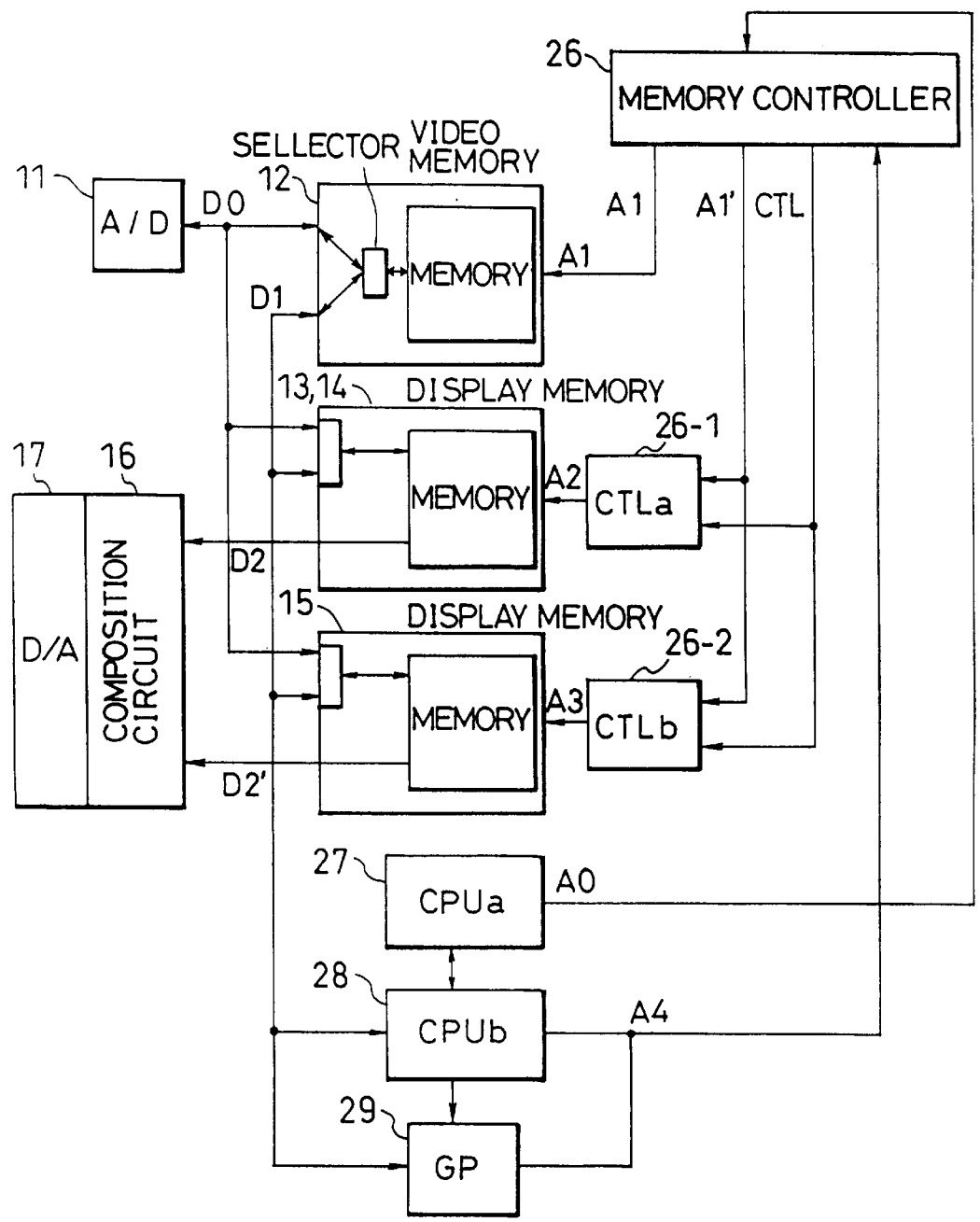
FIG. 15 shows a configuration example for bus lines connecting a controller, a video memory and each of display memories.
Figure 16:
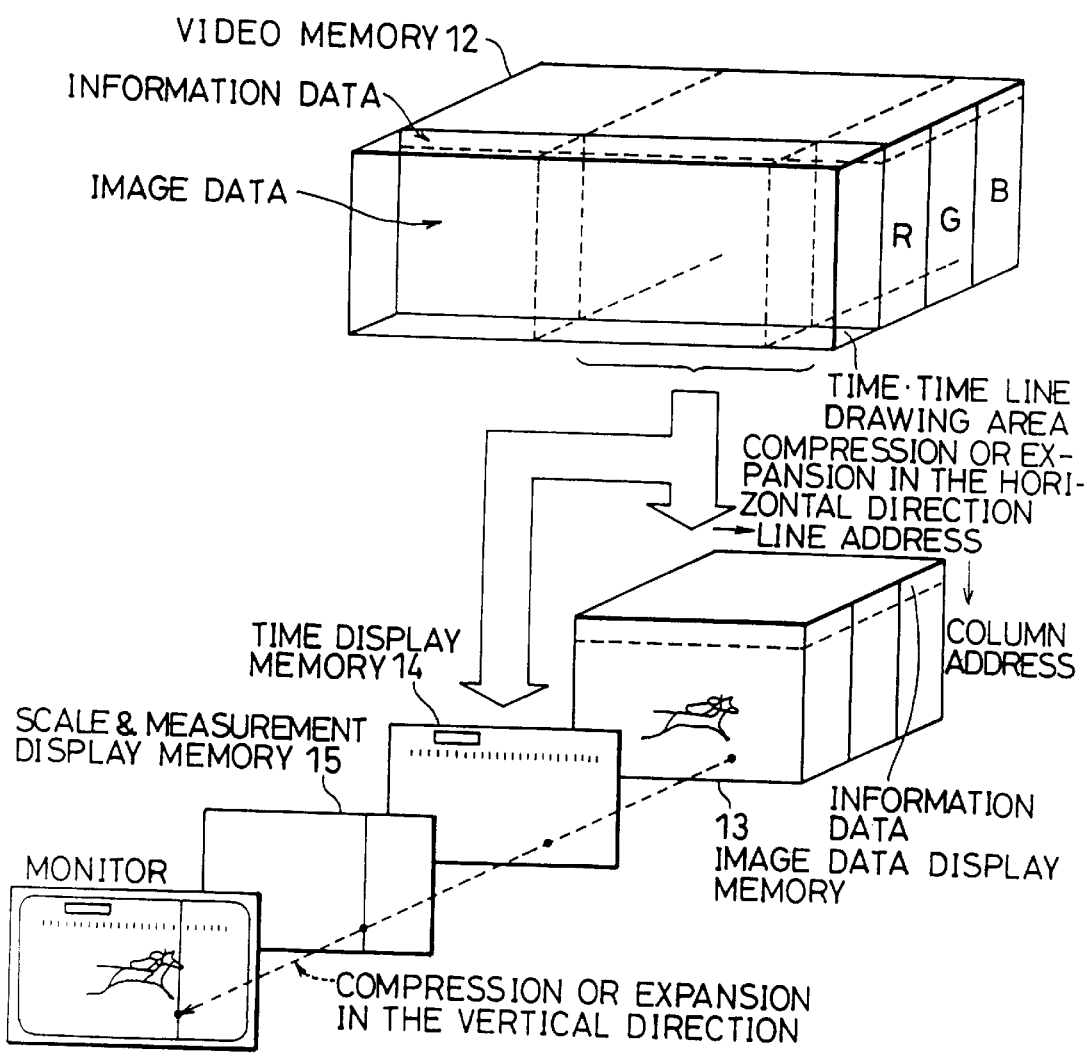
FIG. 16 is a figure to explain relationship between the video memory and each of display memories.

Read or write operation for video image data by the controller 22 is explained next. FIG. 15 shows a configuration example of bus lines connecting the controller, the video memory and display memories. FIG. 16 is a figure to explain relationship between the video memory and each of display memories. The A/D conversion circuit 11, the video memory 12 and display memories 13 to 15 are connected through the high speed video image data bus (DMA data bus) D0. Video image data can be transferred rapidly from the A/D conversion circuit 11 to the video memory 12, through the high speed data bus DO using DMA channel control. Also, image data necessary for displaying, information data and drawing information data can be rapidly transferred from the video memory 12 to each of display memories 13 to 15. The video memory 12, each of display memory 13 to 15, CPUb 28 and GP 29 are connected to each other through the CPU controlled data bus D1. This bus line is used when CPUb 28 reads image data or information data in the video memory 12, when GP 29 draws time and time lines in the memory area for such data of the video memory 12, and when GP 29 draws drawing information data into each of display memories. The data bus D2 for reading out data from the image data display memory 13 and from the time display memory 14, and the data bus D2' for reading out data from the scale & measurement display memory 15 are connected to the data composition circuit 16. Image data and drawing information data are read out from each display memory 13 to 15 through these buses synchronously to the same video synchronizing signal, and then combined to one digital video data stream at the data composition circuit 16. The output of the data composition circuit is converted to analog video signal by the D/A conversion circuit 17 so as to be displayed on the video monitor screen.

The CPUa-controlled address bus A0 is connected between the CPUa 27 and the memory controller 26. The address bus A4 which is used both as a CPUb-controlled address bus and as a drawing control address bus is connected between CPUb 28 and the memory controller 26. The DMA control address bus A1 is connected between the memory controller 26 and the video memory 12, and the CPUb-control address bus A1' is connected between the video memory 12, the controller CTLa 26-1 and the controller CTLb 26-2. The D/A display control address bus CTL is connected between the memory controller 26, the CTLa 26-1 and the CTLb 26-2. Also, the display memory control bus A2 is connected between CTLa 26-1, display memories 13 and 14, and the display memory control bus A3 is connected between CTLb 26-2 and the display memory 15, respectively.

The memory controller 26 is a memory manager which manages and controls such functions as control of connection interfaces to external equipment, DMA transfer control for data from the A/D conversion circuit 11, DMA transfer control for data transfer between memories, data writing in and reading from memories under CPU control and control for drawing information data, according to priorities. CPUa 27 controls mainly DMA transfer for the external equipment interface and A/D conversion, while CPUb 28 controls together with GP 29 reading/writing of memories and drawing information data.

Controls for video image recording and displaying are explained next. When a record start signal is received from the main controller 3, the remote controller 4 or external equipment, CPUa 27 sends a DMA control command to the memory controller 26, so that image data and information data can be stored in an RGB area of the video memory 12 through DMA channels. The memory controller 26 generates DMA addresses on the DMA control address bus A according to the command, causing image data and information data to be stored rapidly in the RGB area of the Video memory 12. CPUb 28 reads information data stored in the video RGB area of the video memory 12 and controls GP 29 to draw time values and time lines in the time and time line drawing area of the video memory as shown in FIG. 16.

Figure 23:
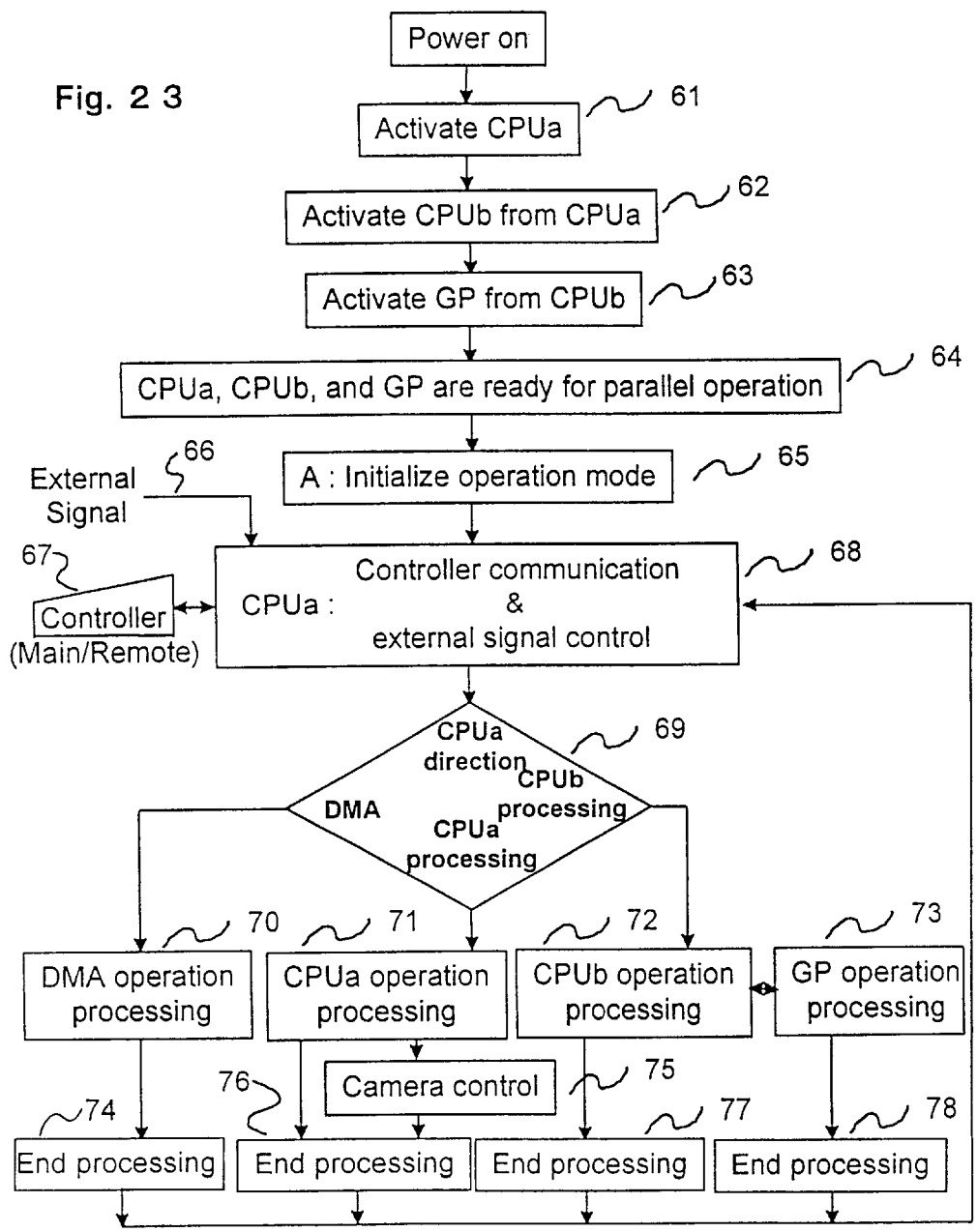
FIG. 23 shows flow charts for the operation of CPUa and CPUb.

FIGS. 23 and 24 show flow charts for the operation of CPUa and CPUb. Detailed description for operation mode initialization A shown as 65 in FIG. 23 is illustrated in FIG. 24. In procedure 68, CPUa receives external signals such as the clock signal from the central clock, the time start signal and the record start signal, receives manual input instruction data from the operation panel via controller 67, and then outputs various directions in procedure 69. DMA (Direct Memory Access) is an architecture which enables direct access to memories without using a CPU. This architecture is used for memorizing A/D converted video signals in the video memories, or for transferring data stored in the video memory to the display memory. Operations of CPUa in procedure 71 include video memory control, controller communication control, video camera control, zooming or scrolling control, and expansion control up to twice. Operations 72 and 73 of the CPUb include control of external recording equipment such as an MD (Mini-Disc) or a DAT (Digital Audio Tape), data printer control, letter generation control, display screen drawing control for time or time lines, and screen display control.

When video image display is required after recording is started, CPUa 27 sends a DMA control signal to the memory controller 26 for transferring data stored in the video memory 12 to the image data display memory 13 and to the time display memory 14. Triggered by this DMA control signal, the memory controller 26 generates DMA addresses on the address bus A' in order that image data and information data are transferred to the image data display memory, and that drawing information data for time and time lines are transferred to the time display memory 14, respectively, under DMA transfer control as shown in FIG. 16. Image data are then read out from the image data display memory 13 and from the time display memory 14 onto the data bus D2, combined with drawing information data at the data composition circuit 16 and converted to output analog video signals by the D/A conversion circuit 17. The memory controller 26 controls memories so that the image data writing and the information data writing into the video memory should be carried out simultaneously, and so that data transfers from the video memory 12 to display memories 13 and 14 should be carried out simultaneously.

When a command for scale line generation, for measurement or for measurement setting is received from one of the controllers, CPUb 28 generates drawing information data in cooperation with GP 29 according to the command from CPUa 27, transfers drawing information data to the scale & measurement display memory 15. The drawing information data are then read out from the scale & measurement display memory 15 onto the data bus D2', combined with image data from data bus D2 at the data composition circuit 16 and converted to output analog video signals by the D/A conversion circuit 17. An output image displayed on the video monitor screen is a still picture with its time axis being the horizontal axis of the monitor screen. Thus measurement and display of the goal arrival time can be accomplished by generating an appropriate vertical scale line in the scale & measurement display memory and by measuring and displaying information corresponding to the position of this scale line.

As described hereinbefore, image data corresponding to several pictures on the monitor screen are stored sequentially in the video memory 12, and each display memory 13 to 15 has its own memory area of 2Kbytes in the line direction and 2Kbytes in the column direction, which are composed of VIDEO RAM devices. Vertical scanning line numbers of the video display on the monitor screen are 485 for the standard NTSC video format, and 1035 for both Hi-Vision and non-interlace Hi-Vision video formats. Pixel numbers for horizontal scanning lines corresponding to the time axis are 1024, being the same for all video formats. Image data and information data in the video memory 12 are transferred to the image data display memory 13, and drawing information data for time and time lines in the video memory 12 are transferred to the time display memory 14. Scrolling in the horizontal direction on the monitor screen can be carried out by shifting the reading out addresses in the horizontal direction of these display memories as shown in FIG. 16. Scrolling in the vertical direction on the monitor screen can be carried out by shifting the reading out addresses in the vertical direction of display memories 13 and 14.

When the picture size on the monitor screen is to be compressed or expanded, image data and information data in the video memory 12 are initially compressed or expanded only in the horizontal direction (along line addresses). The horizontally compressed or expanded image data are transferred to the image data display memory 13 and also horizontally compressed or expanded drawing information data for time and time lines are transferred from the video memory 12 to the time display memory 14, and then these data are read out compressed or expanded only in the vertical direction (along column addresses) from display memories 13 and 14.

Figure 17:
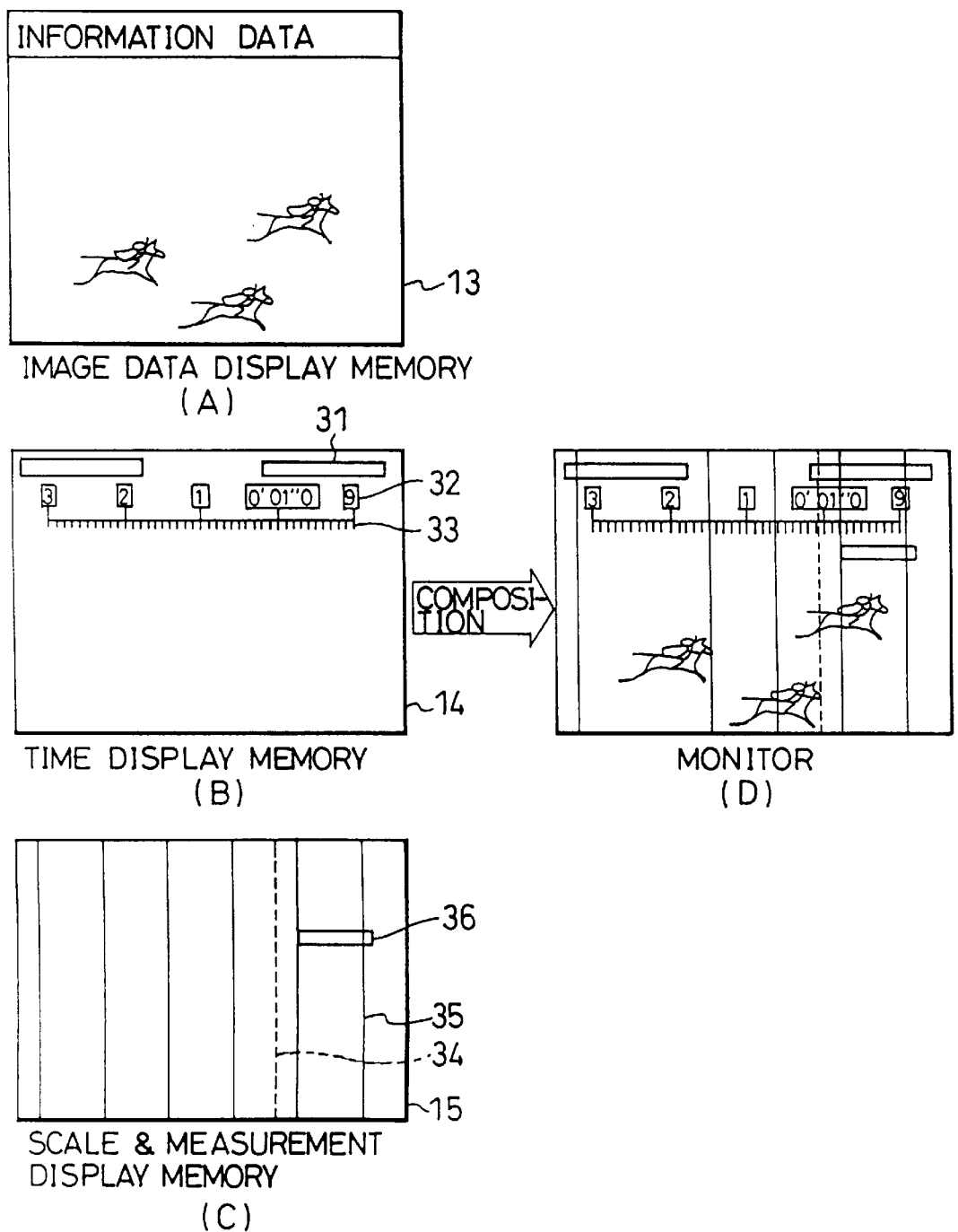
FIG. 17 shows an example of composed picture of recorded image data in the image data display memory, drawing information data in the time display memory and drawing information data in the scale & measurement display memory.
Figure 18:
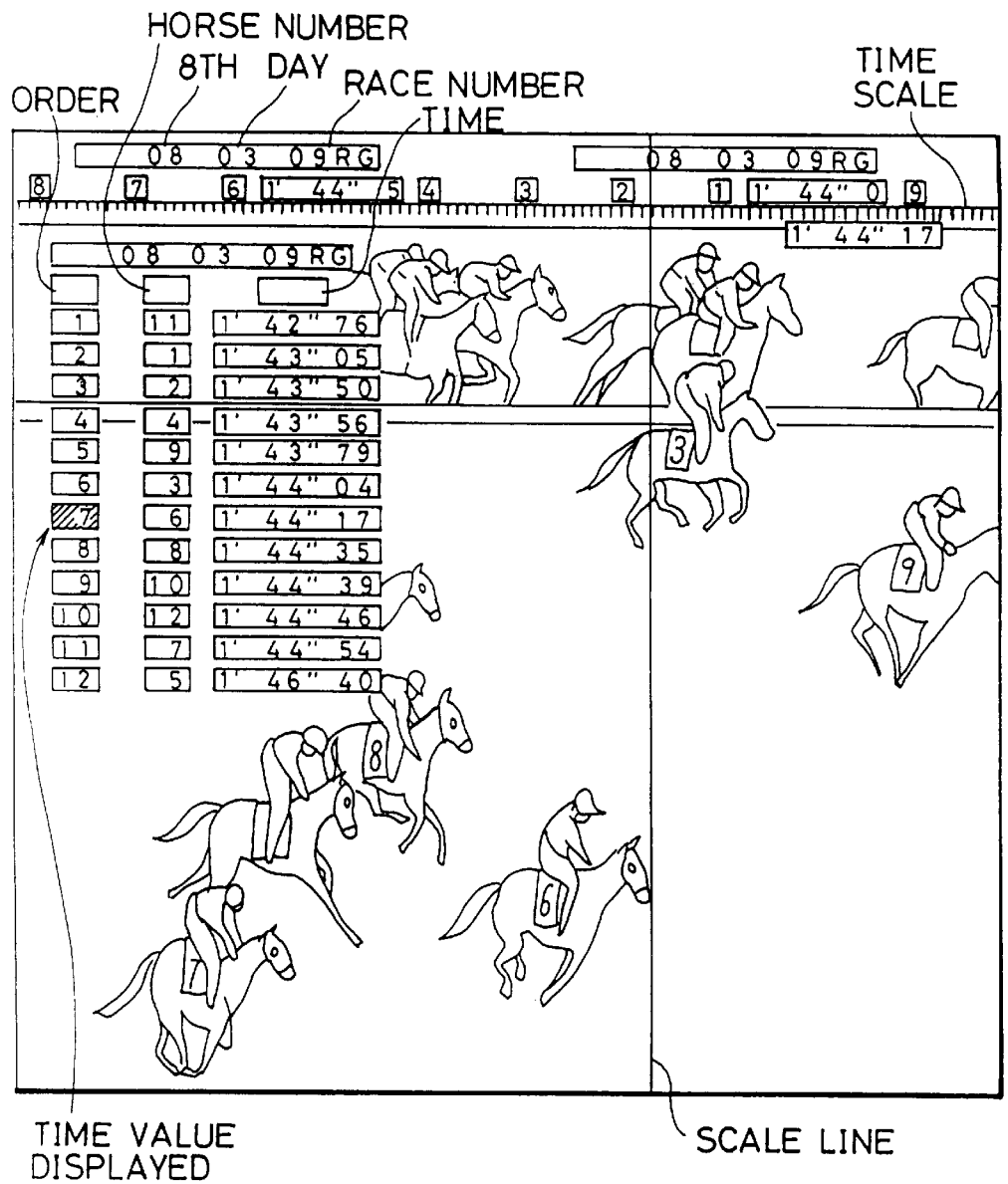
FIG. 18 shows an example of composed display for time measurement.

FIG. 17 shows an example for picture composition of recorded image data in the image data display memory, data in the time display memory and drawing information data in the scale & measurement display memory. FIG. 18 shows an example for picture composition of time measurement. Image data and information data which are necessary for displaying video images are stored in the image display memory as shown in FIG. 17(A). Black lines for separating each picture are inserted when intermittent recording which records discretely only necessary scenes is selected, and zero second line and one second line are also inserted in motorboat races. Time values 32 at each ¹⁄₁₀ second interval, time lines 33 at every ¹⁄₁₀ second or ¹⁄₁₀₀ second intervals, and event information display frame 31 are drawn in the time display memory as shown in FIG. 17(B). Event data which consist of the race site name, the event number, the event date and the race number are drawn in the event information display frame 31. These event data based on information data are usually transferred from the time & time line display memory area in the video memory to the time display memory, but they can be also directly drawn in the time display memory based on the information data. A scale line 34, an auxiliary line 35 and a frame for time display 36 are drawn in the scale & measurement display memory, and the time value which corresponds to the position of the scale line 34 is drawn in the time display frame as shown in FIG. 17(C). Data in these display memories are read out synchronously by the same video synchronization signal, composed and then converted to analog video signals to be displayed on the monitor screen as shown in FIG. 17(D).

Just as described above, when a time value is displayed at time measurement, the time display frame 36 is drawn first with the scale line 34 and the auxiliary line 35, and then the time value is drawn in the time display frame 36 based on the time data which are selectively read from information data in the image data display memory 12 according to the drawing position of the scale line 34. Thus, when the display position of the scale line 34 are moved, the time value in the time display frame 36 is automatically renewed to a new value which corresponds to the new scale line position.

FIG. 18 shows an example of video screen display at arrival order decision and time record acknowledgment in a horse race. The seventh arrival time is being acknowledged in this example. By fitting the scale line to the nose of the horse wearing number 6, the time value of 1' 44" 17 which corresponds to the time data for the display position of the scale line is displayed in the time display frame and in a time record frame for arrival order record. As shown in this example, measurement, display and record of arrival time for a race participant can be carried out by storing information data containing time data along with image data into the video memory time sequentially, and then reading time data among information data corresponding to the relationship between the image position and the scale line position. Consequently, both decision of arrival order and recording of time can be carried out by entering the back number of the horse according to the arrival order, moving the scale line to the nose position of the horse and then pushing the key for acknowledgment.

It is to be understood that the invention is not limited to the specific embodiments thereof, and variation of the invention is possible in light of the above description. For example, in contrast to the above description where time values or time lines are drawn in the time and time line drawing area prepared in the video memory and only the necessary area for displaying is read out with image data so as to be transferred to the image data display memory and to the time display memory, it is possible that the controller reads image data from the video memory and draws time or time lines in the time display memory, and it is also possible to select information to be drawn in the drawing area for time and time lines by using the information data. Although the high speed image processing apparatus described hereinbefore is such that image data and information data in the video memory are transferred to display memories, composed by the data composition circuit and then converted to analog output video signals by the D/A conversion circuit, a variation is possible such that image data and information data are recorded once in the video image recording apparatus and are read back from the recording apparatus to be stored in the video memory for replaying later.

Figure 19A:
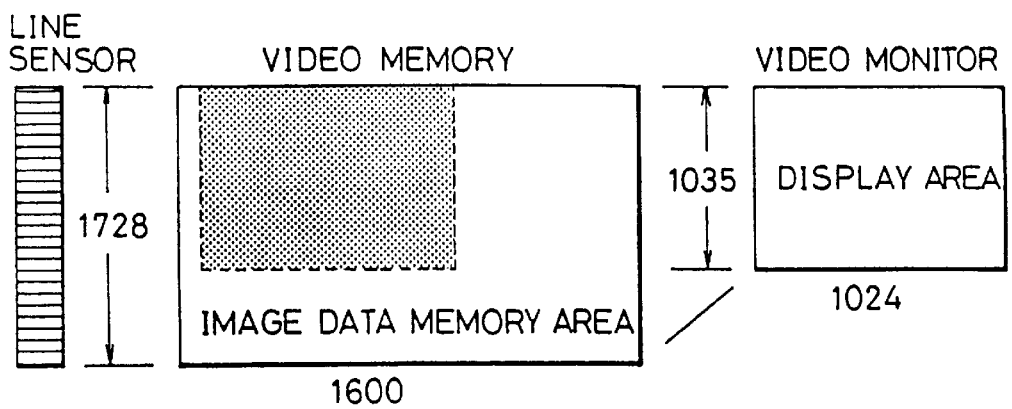
FIG. 19 shows an example of relationship between memory size of a video memory for image data and display size of a video monitor, and an example of display with a reduced size.
Figure 19B:
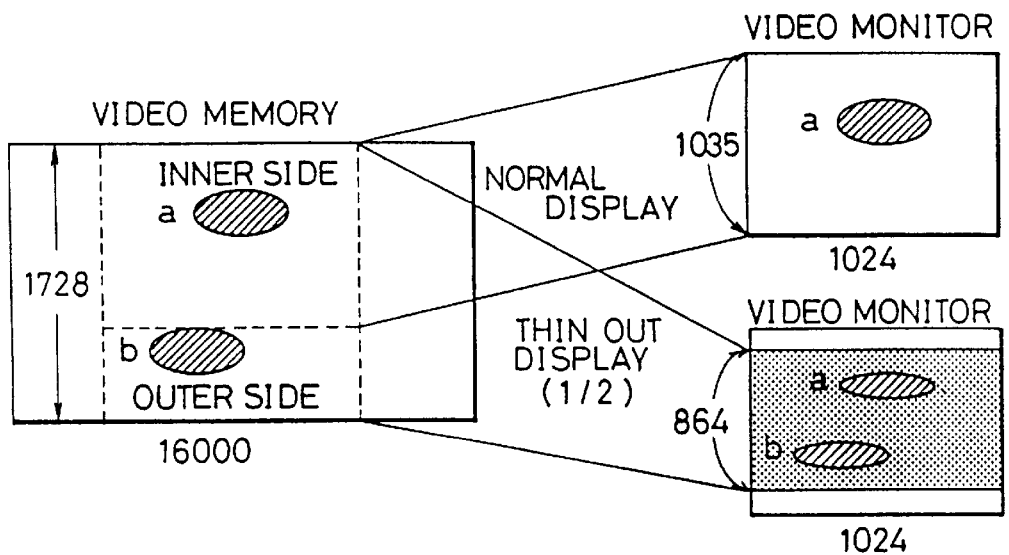

FIG. 19(A) shows the relationship between the image data storage size of the video memory and the display size of the video monitor screen, and FIG. 19(B) shows an example of compression and expansion in displaying. As described hereinbefore, the color line sensor in the line sensing camera 1 has 1,728 pixels for each color component. In the video memory 12 of the high speed image processing apparatus, 16Kbytes in the line direction and 2Kbytes in the column direction are assigned as the memory area. Among this memory area, 1,728 bytes in the column direction are assigned as the memory area for image data and the rest of 320 bytes in the column direction are assigned as the memory area for information data. Meanwhile, vertical scanning line numbers on the video monitor screen for the standard TV(NTSC), Hi-Vision TV(HD) or non-interlace Hi-Vision TV(PHD) video signal formats are 485, 1035 and 1035, respectively, when the video monitor conforms to such video signal formats. The pixel number in the horizontal scanning which corresponds to the time axis is 1024 for all of the video signal formats.

When the color line sensor having 1,728 pixels is used, all images of moving objects which pass the finish line are taken from the inner side to the outer side of the racing course, and stored in the video memory 12. In case of normal display, image data are read out from the video memory 12 sequentially up to the volume for one full picture display, are transferred to display memories 13 and 14, and are then read out by using the video synchronizing signal so as to be displayed on the video screen as a still picture from the inner side. When it is necessary to display objects in the outer side of the racing course which are not displayed on the initial picture, it can be realized either by shifting reading addresses of display memories 13 and 14 through scrolling so as to display a picture shifted to the outer side, or by reading addresses which are thinned out to half of the vertical scanning line numbers, 864, in order to display the whole still picture for both the inner side and the outer side of the course near the finish line using only 864 vertical scanning lines as shown in FIG. 19(B).

Displaying images in the horizontal direction can be carried out not only by transferring image data sequentially from the video memory 12 to display memories 13 and 14 as horizontally continuous display mode, but also by transferring thinned out image data as horizontally thinned out display mode. Also there is a variation such that image data transfer from the video memory 12 are controlled in order that the number of displayed pixels in the still picture can be compressed or expanded by changing the read out pixel number per unit time in the horizontal direction as horizontal compression-expanding mode. As information data are transferred to the display memory 13 even if images are displayed as the horizontal compression-expanding mode, measurement of arrival time and display of the arrival time can be carried out by reading time data contained in the information data within the display memory 13, in response to the specified position of the scale line.

Although in the embodiment explained hereinbefore the pixel number of the color sensor is selected as 1728 and the display area of the video monitor is set to 1035 pixels, it is possible to increase the pixel number of the color sensor in order to increase the image resolution. Thinning out ratio of image data displayed on the video monitor screen is not limited to ½ but also can be extended to ¼ or to other values, according to the pixel number of the sensor and to the scope size. A black and white sensor can be also used instead of the color sensor.

FIG. 20 shows examples for compression and expansion of displayed images with reference position indication for the compression and expansion. FIG. 21 shows the procedure to calculate the starting address of the display memories for reading out at compression or expansion of the image to be displayed.

Figures 20A, 20B:
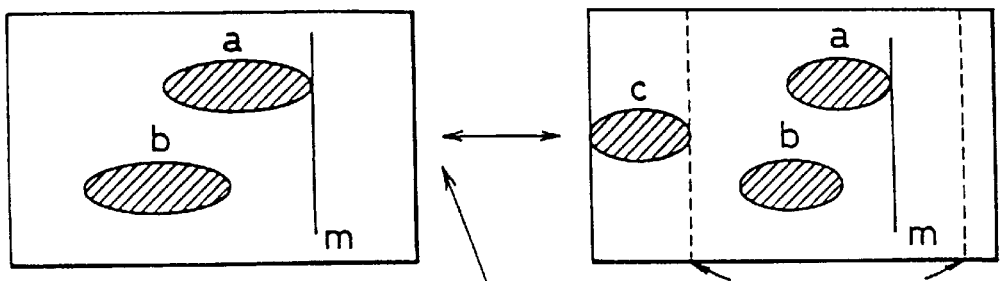
FIG. 20 shows an example of expansion or compression from a video display image, and an example of a reference position for expansion or compression.
Figure 20C:
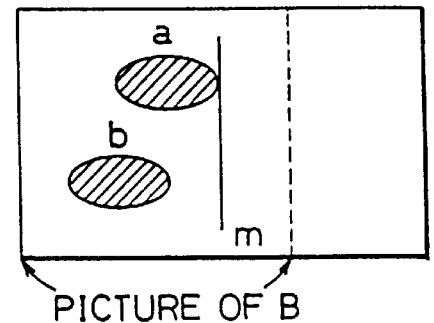

In extending the display area where objects "a" and "b" are moving from the left side of the screen to the right side of the screen and the scale line is displayed at the top of the moving object "a" as shown in FIG. 20(A), the moving object "c" which is running behind the moving objects "a" and "b" can be displayed within the screen area if the position of the scale line "m" is fixed at expansion, as shown in FIG. 20(B). On the contrary, if the start addresses for reading the display memories are fixed at expansion, the moving object "c" which is behind objects "a" and "b" falls out of the display area of the video screen, as shown in FIG. 20(C). Expansion of the display area as shown in FIG. 20(C) is common in conventional moving image judging apparatuses, whereas expansion of the display area as shown in FIG. 20(B) is carried out in this invention. In order to realize this, starting addresses for reading out the image data display memory 13 and the time display memory 14 are calculated using a prescribed position in the central area of the picture as a reference, and then image data and drawing information data are read out from the calculated starting addresses.

In an image compression and expansion method which usually varies dot numbers of displayed images, pixel numbers are varied by changing the division ratio of a frequency divider in a PLL(Phase-Locked Loop) circuit so as to change the horizontal dot clock frequency, where the PLL is used to synchronize the horizontal dot clock to the edge of the horizontal video synchronizing signal. In conventional moving image judging apparatuses, the displayed picture after compression or expansion becomes empty in the right hand side of the video screen as shown in FIG. 20(C), because the pixel number is changed by varying the horizontal dot clock frequency while the starting addresses for reading out display memories are kept fixed.

In contrast to the above described conventional method, the division ratio of the frequency divider in the PLL circuit is controlled by the controller 22 in order that the starting addresses for reading out the video display memory 13 and the time display memory 14 can be changed by calculating the values of starting addresses according to the change of the horizontal dot clock frequency in reference to the position of the scale line "m". FIG. 21 shows an example of such calculating procedure. In FIG. 21 where the position of the display starting address is "s" and the position of the scale line address which is used as a reference point is "m" in the MEMORY DATA (D), and the horizontal dot clock frequency is changed from CLOCK #1 to PLL CLOCK #2 in (F) for reading image data to display, the position of the new display starting address "s'" is calculated in the following way; the controller monitors and manages the display starting address of SCALE DATA "s1", the display starting address of MEMORY DATA "s" and the address of the scale line "m" and calculates the pixel number between the display starting address of SCALE DATA "s" and the scale line address "m", frequencies of CLOCK #1 and #2 and the section length of displaying the video image. The ratio between the effective pixel number in the horizontal direction and the full displaying section is calculated from these data, and then the display starting address of SCALE DATA and the display starting address of MEMORY DATA can be changed to the new values, "s1'" and "s'", respectively. It can be easily understood that the calculation method is not limited to the way described above, but other alternative ways can be possible without changing the spirit of the invention.

It is to be understood that the invention is not limited to the specific embodiments thereof, and variation of the invention is possible in light of the above description. For example, in contrast to the above description where the pixel number of the color sensor is selected as 1728 and the display area of the video monitor is set to 1035 pixels, it is possible to increase the pixel number of the color sensor in order to increase the image resolution. In the above embodiment the display position of the scale line is fixed and the display starting addresses is varied, but it is also possible to fix the display position at the center position of the picture and to change the display starting addresses. The above described display position correction method can be applied not only for the compression or expansion method using variable dot number of displayed images, but also for the compression or expansion method using thinning out or interpolating pixel number.

Furthermore, the invention is also applied in a case where images are thinned out in the vertical direction by a number of horizontal lines. By using a color line sensor having 1728 pixel resolution, images of moving objects passing the finish line can be fully taken from the inside to the outside of the race course and stored in the video memory. In case of normal display, image data with continuous horizontal line numbers which can be displayed on the full video screen size are transferred from the video memory to the image data display memory, from which image data are read out so as to display the still picture of the inner side of the race course on the video monitor screen. When a picture for the outer side of the race course which is out of the screen area in normal display is needed, it can be realized either by scrolling read out addresses of display memories to the lower position enabling display of the outer side of the race course, or by reading out image data in the thinning out mode which uses the horizontal line numbers of 864, enabling display of the whole picture from the inside to the outside of the race course near the goal with reduced horizontal line numbers.

Figure 22:
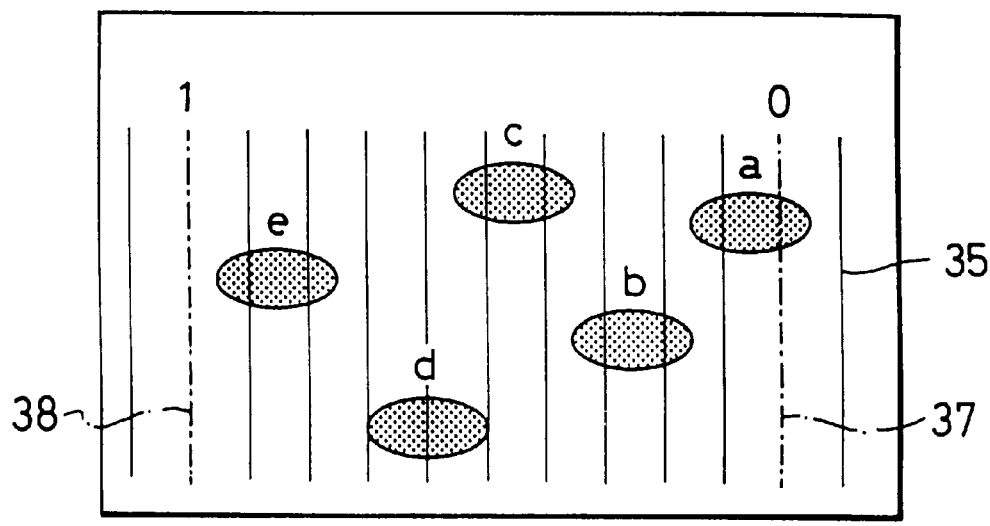
FIG. 22 shows an example for composition of plurality of auxiliary lines with a video display image having zero second and one second time lines for a motorboat race.

FIG. 22 shows an example of composition of a plurality of auxiliary lines on the video display image with the zero second line and the one second line for a motorboat race. The time display frame 36, the scale line 34 and a plurality of auxiliary lines 35 are drawn in the scale & measurement display memory 15 as shown in FIG. 17(C) and are composed with the displayed image. Auxiliary lines are used for judging the goal arrival time difference in terms of horse lengths in a horse race, or for judging whether a flying was made or not by a race participant in a motorboat race. In a motorboat race, the zero second line 37 and the one second line 38 as shown in FIG. 22 are written into the video memory together with image data, and are displayed on the video monitor screen for judging whether there was a flying at the start of the race or not. In order to measure the starting time of each participant boat, auxiliary lines 35 are displayed at the interval of $1/10$ seconds between the zero second line 37 and the one second line 38 as shown in FIG. 22. A judge reads time on the screen by sight using the auxiliary lines. As the auxiliary lines 35 are displayed on the screen together with the scale line 34, the zero second line 37 and the one second line 38, distinction between these lines may become difficult if they are displayed in the same color. In order to avoid the difficulty, different display modes, that is, different colors or different types of lines such as bold lines, thin lines, solid lines or dotted lines are used when the scale line 34 and auxiliary lines 35 are generated by the controller 22 as drawing information data and written into the scale & measurement display memory.

When reading and recording time are carried out automatically using the time scale line 34, recognition whether there was a flying or not can be made easier by using different display modes for resultant data. For example in FIG. 22, after judging whether the position of the scale line 34 is before the zero second line 37 or between the zero second line 37 and the one second line 38, the display color for the time value in the time display frame 36 is set red if the position of a moving object is before the zero second line 37 as like "a" shown in FIG. 22, and set black if the object is between the zero second line 37 and the one second line 38.

It is to be understood that the invention is not limited to the specific embodiments thereof, and variation of the invention is possible in light of the above description. For example, although decision lines such as the scale line, auxiliary lines, the zero second line and the one second line are shown as examples to be displayed in different modes in the above explanation, the invention can be applied in a case where other decision lines are used.

Image data and information data are sequentially stored according to time passing into storage areas for image data and information data which are assigned in video memory, only the necessary area for displaying is transferred to the display memory, information data which are to be composed with the displayed image are transferred to display memories, and then these data are read out and composed in synchronous to the video displaying signal as one output signal, as described hereinbefore. Hence it is clear that even in a case when any necessary image data are to be selected and displayed from image data for several number of continuous pictures, all necessary information on selected image data can be composed with the image data before displaying on the video screen monitor, because all such necessary information data such as the operation mode, the race site and the like have been read and stored at the initial reading of the video memory.

Another improvement by the invention is that the automatic measurement of time value at the position of the scale line becomes possible, because time data have been stored in the video memory as one part of the information data. Furthermore, high speed data processing becomes possible through simplified procedure, because each display memory is provided exclusively for image data, for time and timelines data and for the scale line and auxiliary lines, respectively, and composition of such data is carried out simultaneously at the data composition circuit. Hence automatic reading and recording of elapsed time using the scale line become possible, resulting in the reduction of judge's work loads in judging arrival order, acknowledgment of arrival time and recording. Reduction of errors in reading of elapsed time or judging arrival order, together with simple and sure acknowledgment or recording become thus possible.

Furthermore by the invention it becomes possible to read out both image data and information data concerning the image data at the same time in order to process, to output and to display on the video screen, because such information data, for example various operation mode data which include the race trial mode or the formal race mode in motorboat races, the clockwise course mode or the counter-clockwise course mode in horse races and the test mode, and other information data concerning the image data such as the race site data are stored in the video memory beforehand, together with time data.

Also by the invention, it is possible by scrolling the displayed picture in the vertical direction or by displaying the whole vertical area using thinning out display mode, to recognize moving objects which have passed the finish line through the outer side of the race course even if they have not been displayed on the monitor screen because the vertical resolution of the monitor screen is raised in order to show the inner side of the race course, because the pixel number of the line sensor is set larger than the pixel number of the video monitor screen, image data for several number of pictures are stored in the video memory and image data are thin out or compressed/expanded when they are read out and displayed. Additionally, prompt acknowledgment of arrival order by looking the whole image of the race or prompt measurement of time difference by horse length in horse races become possible. Also, displaying scaled up in the horizontal direction in order to raise the horizontal resolution is possible, by increasing the displayed pixel number without thinning out image data.

Another effect of the invention is that expansion or compression of displayed picture around a fixed interested position in the displayed picture is possible, because image data are read out from the video memory starting from the horizontal starting address which is calculated by using a prescribed center position in the displayed picture. Accordingly, a desired picture with compression or expansion around a prescribed position can be obtained through simple operation.

Also another effect of the invention is that misjudging or confusion in recognizing decision lines can be avoided when various decision lines are composed with the still image to be displayed on the video monitor screen so as to enable rapid and correct decision, because such lines are displayed in different display modes such as in different colors or using different kinds of lines. Additionally, confirmation of decision results such as whether there was a flying or not at the start of the race can be instantly carried out, because display modes for measured time values can be changed according to whether the position of the measured value is ahead or behind the reference line.

What are claimed are:

1. A moving image judging apparatus for displaying an image on a video display monitor comprising: (a) a line sensing camera including a line sensor having more pixels than a number of vertical scanning lines for the video display monitor, and which produces input video signals of images of moving objects by scanning said moving objects using line sensor elements to scan in a direction orthogonal to a moving direction of said moving objects, (b) a video image processing apparatus which converts said input video signals from said line sensing camera into digital image data signals, stores said digital image data signals into a memory sequentially according to a time sequence, then reads out said image data signals stored in the memory area necessary for displaying and converts them into analog output video signals as output signals, (c) a controller for said image processing apparatus to select an operation mode and to control the apparatus, and (d) an external output apparatus which displays said analog output video signals from said image processing apparatus on the video display monitor, wherein said image processing apparatus comprises: (p) a memory means for storage purpose having a first memory area for said digital image data signals to be stored sequentially according to the time sequence and a second memory area for information data concerning said digital image data signals, said memory means comprising a dynamic random access memory (DRAM), (q) a memory means for display purpose where image data necessary for displaying image data and drawing information data to be composed with said image data are written in and afterwards read out in synchronization to a video displaying signal, comprising an image data display memory where the image data and the information data are stored, a time display memory where time, time lines and information on images are stored as said drawing information data, and a scale and measurement display memory where a scale line for time measurement of displayed images are stored, (r) an output means which composes said image data and said drawing information data to convert to analog output video signals, and (s) a control means which has a connection interface to external equipment, selects an operation mode according to a selection command from said controller, controls said signal conversions from analog to digital and digital to analog, controls said data composition of image data and drawing information data, controls reading and writing of said memory means for storage purpose and said memory means for display purpose, and generates said drawing information data.

2. A moving image judging apparatus as claimed in claim 1 wherein said memory means for storage purpose has a third memory area for drawing information data, said control means generates drawing information data to be composed with image data based on said information data stored in said third memory area for information data, stores the drawing information data into said third memory area for drawing information data and then writes the drawing information data into the memory means for display purpose together with said digital image data.

3. A moving image judging apparatus as claimed in claim 2 wherein said digital image data signals are stored in said memory means for storage purpose sequentially as a time sequence together with said information data including time data for said digital image data signals, drawing information data for displaying images read out from a memory area are composed with said digital image data signals and then converted to analog video signals so as to be displayed as a video picture on the video display monitor, a scale line is composed and displayed on said video picture, and then automatic time measurement is carried out by reading directly said time data that correspond to the position of the displayed scale line.

4. A moving image judging apparatus as claimed in claim 1 wherein said external output apparatus comprises a display apparatus including the video display monitor for displaying said analog video output signals, and a video image recording apparatus for recording image data and information data and a data printing apparatus for printing out images or data, said external output apparatus storing said digital image data and said information data in said memory means for storage purpose in said video image processing apparatus into said video image recording apparatus, and afterwards returns the image data and the information data stored in said video image recording apparatus back to said memory means for storage purpose in order to replay, wherein said digital image data signals are stored in said memory means for storage purpose each time scanning of said line sensor element occurs.

5. A moving image judging apparatus as claimed in claim 1 having a pixel number expansion/compression mode in the horizontal direction, a pixel number expansion/compression mode in the vertical direction and a pixel number expansion/compression mode in both horizontal and vertical directions, wherein said line sensing camera scans moving objects in the direction orthogonal to the moving direction of the moving object at a predetermined constant time interval in order to produce said input video signals which are converted to said digital image data signals and then stored in said memory means for storage purpose sequentially together with said information data containing time data for said digital image data signals, contents in a memory area necessary for displaying are read out, composed with drawing information data which are displayed according to said information data, converted to video image signals and then displayed on the video display monitor, said digital image data signals in said memory area necessary for displaying are written in said memory for display purpose and then read out in synchronization to a video displaying signal, pixel number expansion or compression in the horizontal direction is carried out at data transfer from said video memory to said memory for display purpose, and pixel number expansion or compression in the vertical direction is carried out at reading out from said memory for display purpose in synchronization to the video displaying signal.

6. A moving image judging apparatus as claimed in claim 1, wherein:
   said DRAM memory means for storage purpose includes a memory area for storing said digital image data signals corresponding to all pixels produced by said line sensor which has more pixels than the number of vertical scanning lines for the video display monitor,
   said memory means for display purpose comprising a video RAM having an image data display memory which has a larger memory area than a memory area necessary for displaying an image on the video display monitor,
   means to transfer output image data of all pixels produced by said line sensor sequentially from the DRAM memory means for storage purpose to the video RAM memory means for display purpose,
   means for displaying one of the image of an inside and the image of an outside of a racecourse, with the image of the inside of the racecourse being normally displayed, but when the moving object passes outside the area, an image of the entire racecourse is displayed on the video display monitor after compressing said output image data of all pixels produced by the line sensor in the vertical direction.

7. A moving image judging apparatus as claimed in claim 1 wherein said control means writes drawing information data such as a scale line for time measurement or plural number of auxiliary lines into said scale and measurement display memory, and said output means composes said plural number of auxiliary lines on the displayed image using different displaying modes from those for other lines using different colors or different kinds of lines.

8. A moving image judging apparatus comprising: (a) a line sensing camera which produces input video signals of images of moving objects by scanning said moving objects using line sensor elements to scan in the direction orthogonal to the moving direction of said moving objects at a predetermined constant time interval, (b) a video image processing apparatus which converts said input video signals from said line sensing camera into digital image data signals, stores said digital image data signals into a memory sequentially according to the time sequence, then reads out said image data signals stored in the memory area necessary for displaying and converts them into analog output video signals as output signals, (c) a controller for said image processing apparatus to select an operation mode and to control the apparatus, and (d) an external output apparatus which displays said analog output video signals from said image processing apparatus, wherein said image processing apparatus comprises: (p) a memory means for storage purpose, including a dynamic random access memory (DRAM) which has a memory area for said digital image data to be stored sequentially according to the time sequence and a memory area for information data concerning said digital image data, (q) a memory means for display purpose, including a video RAM, where image data necessary for displaying image data and drawing information data to be composed with said image data are written in and afterwards read out in synchronization to a video displaying signal, comprising an image data display memory where the image data and the information data are stored, a time display memory where time, time lines and information on images are stored as said drawing information data, and a scale and measurement display memory where a scale line for time measurement of displayed images are stored,(r) an output means which composes said image data and said drawing information data to convert to analog output video signals, and (s) a control means which has a connection interface to external equipment, selects an operation mode according to a selection command from said controller, controls said signal conversions from analog to digital and digital to analog, controls said data composition of image data and drawing information data, controls reading and writing of said memory means for storage purpose and said memory means for display purpose, generates said drawing information data, and controls functions of said moving image judging apparatus wherein at expansion or compression of the video display image said control means transfers image data necessary for displaying and information data from said memory means for display purpose, expands or compresses pixel number of data read out from said memory means for display purpose by changing horizontal clock frequency for displaying, determines the starting position of reading said memory means for display purpose according to a predetermined position on the video display image in reference to the position of said scale line, and the displayed images are compressed or expanded in the horizontal direction based on the reading out positions.

9. A moving image judging apparatus as claimed in claim 8 wherein said control means calculates the pixel number in the horizontal direction from the clock signal for said video displaying signal, calculates the pixel number between the starting position of reading out and said reference point in order to renew reading the start address of said image data display memory, the start address of said time display memory and the start address of said scale and measurement display memory, according to the clock frequency change.

10. A moving image judging apparatus comprising: (a) a line sensing camera which produces input video signals of images of moving objects by scanning said moving objects using line sensor elements to scan in the direction rectangular to the moving direction of said moving objects at a predetermined constant time interval, (b) a video image processing apparatus which converts said input video signals from said line sensing camera into digital image data signals, stores said digital image data signals into a memory sequentially according to the time sequence, then reads out said image data signals stored in the memory area necessary for displaying and converts them into analog output video signals as output signals, (c) a controller for said image processing apparatus to select an operation mode and to control the apparatus, and (d) an external output apparatus which displays said analog output video signals from said image processing apparatus, wherein said image processing apparatus comprises: (p) a memory means for storage purpose, including a dynamic random access memory (DRAM) which has a memory area for said digital image data to be stored sequentially according to the time sequence and a memory area for information data concerning said digital image data, (q) a memory means for display purpose, including a video RAM, where image data necessary for displaying image data and drawing information data to be composed with said image data are written in and afterwards read out in synchronization to a video displaying signal, comprising an image data display memory where the image data and the information data are stored, a time display memory where time, time lines and information on images are stored as said drawing information data, and a scale and measurement display memory where a scale line for time measurement of displayed images are stored, (r) an output means which composes said image data and said drawing information data to convert to analog output video signals, and (s) a control means which has a connection interface to external equipment, selects an operation mode according to a selection command from said controller, controls said signal conversions from analog to digital and digital to analog, controls said data composition of image data and drawing information data, controls reading and writing of said memory means for storage purpose and said memory means for display purpose, generates said drawing information data, and controls functions of said moving image judging apparatus wherein at expansion or compression of the video display image said control means transfers image data necessary for displaying and information data from said memory means for display purpose, expands or compresses pixel number of data read out from said memory means for display purpose in synchronization to said video displaying signal by changing horizontal clock frequency for displaying, determines the starting position of reading said memory means for display purpose according to a predetermined position on the video display image in reference to the position of the center of a displayed picture, and the displayed images are compressed or expanded in the horizontal direction based on the reading out positions.

* * * * *